United States Patent
Kelly et al.

(10) Patent No.: US 10,838,772 B2
(45) Date of Patent: *Nov. 17, 2020

(54) TECHNOLOGIES FOR ADAPTIVE COLLABORATIVE OPTIMIZATION OF INTERNET-OF-THINGS SYSTEMS

(71) Applicant: Intel Corporation, Santa Clara, CA (US)

(72) Inventors: Damian Kelly, Naas (IE); Keith A. Ellis, Carlow (IE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/291,235

(22) Filed: Mar. 4, 2019

(65) Prior Publication Data

US 2020/0034205 A1 Jan. 30, 2020

Related U.S. Application Data

(63) Continuation of application No. 15/392,855, filed on Dec. 28, 2016, now Pat. No. 10,223,169.

(51) Int. Cl.
*G06F 9/50* (2006.01)
(52) U.S. Cl.
CPC .................................. *G06F 9/5072* (2013.01)
(58) Field of Classification Search
None
See application file for complete search history.

(56) References Cited

U.S. PATENT DOCUMENTS

| 4,500,977 A | * | 2/1985 | Gelhard | G01S 15/18 367/108 |
| 5,952,804 A | * | 9/1999 | Hamamura | G05B 19/237 318/560 |
| 7,778,632 B2 | * | 8/2010 | Kurlander | H04M 1/72566 348/61 |
| 7,873,724 B2 | * | 1/2011 | Horvitz | G06N 7/005 709/224 |
| 10,223,169 B2 | * | 3/2019 | Kelly | G06F 9/5072 |

(Continued)

*Primary Examiner* — Ramesh B Patel
(74) *Attorney, Agent, or Firm* — Hanley, Flight & Zimmerman, LLC

(57) ABSTRACT

Technologies for collaborative optimization include multiple Internet-of-Things (IoT) devices in communication over a network with an optimization server. Each IoT device selects an optimization strategy based on device context and user preferences. The optimization strategy may be full-local, full-global, or hybrid. Each IoT device receives raw device data from one or more sensors/actuators. If the full-local strategy is selected, the IoT device generates processed data based on the raw device data, generates optimization results based on the processed data, and generates device controls/settings for the sensors/actuators based on the optimization results. If the full-global strategy is selected, the optimization server performs those operations. If the hybrid strategy is selected, the IoT device generates the processed data and the device controls/settings, and the optimization server generates the optimization results. The optimization server may provision plugins to the IoT devices to perform those operations. Other embodiments are described and claimed.

26 Claims, 9 Drawing Sheets

(56) References Cited

U.S. PATENT DOCUMENTS

| | | | |
|---|---|---|---|
| 2005/0113959 A1* | 5/2005 | Kajiyama | G05B 19/414 |
| | | | 700/181 |
| 2005/0132378 A1* | 6/2005 | Horvitz | G06N 7/005 |
| | | | 718/104 |
| 2006/0149905 A1* | 7/2006 | Park | H04L 67/12 |
| | | | 711/141 |
| 2007/0099602 A1* | 5/2007 | Kurlander | H04M 1/72566 |
| | | | 455/418 |
| 2010/0299138 A1* | 11/2010 | Kim | G06F 40/205 |
| | | | 704/9 |
| 2015/0310461 A1* | 10/2015 | Lee | H04L 12/2827 |
| | | | 705/412 |
| 2016/0269999 A1* | 9/2016 | Hwang | H04W 4/80 |
| 2017/0091349 A1* | 3/2017 | R M | G06F 30/13 |

\* cited by examiner

TECHNOLOGIES FOR ADAPTIVE COLLABORATIVE OPTIMIZATION OF INTERNET-OF-THINGS SYSTEMS

CROSS-REFERENCE TO RELATED APPLICATIONS

The present application is a continuation application of U.S. application Ser. No. 15/392,855, entitled "TECHNOLOGIES FOR ADAPTIVE COLLABORATIVE OPTIMIZATION OF INTERNET-OF-THINGS SYSTEMS," which was filed on Dec. 28, 2016, and which issued as U.S. Pat. No. 10,223,169 on Mar. 5, 2019.

BACKGROUND

Current Internet-of-Things (IoT) systems may include a community of IoT devices and/or associated sensors and actuator end nodes. Typical use cases for such systems include optimization or coordination of the settings and controls for the IoT devices (or associated sensors/actuators). Typical systems may use cloud computing servers to perform optimization algorithms on aggregated device data and relay the resulting optimized settings or controls back to the source IoT devices. Any change in the division of the computational workload between the IoT devices and the remote cloud servers may require manually re-architecting or otherwise redesigning the system.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
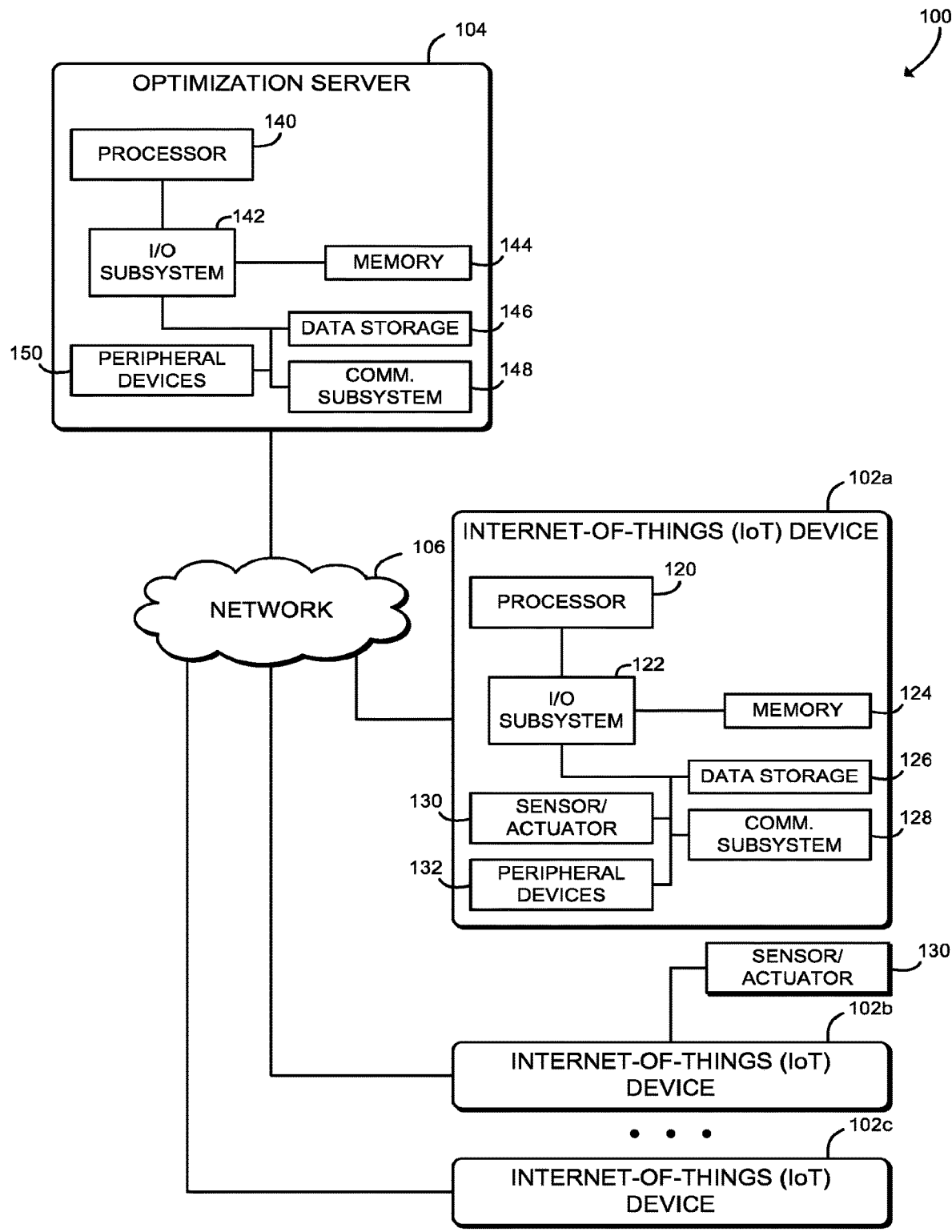
FIG. 1 is a simplified block diagram of at least one embodiment of a system for collaborative optimization.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for collaborative optimization includes multiple Internet-of-Things (IoT) devices 102 in communication with an optimization server 104 over a network 106. In use, as described further below, each IoT device 102 collects raw device data from one or more sensors/actuators 130. The system 100 pre-processes the raw device data, optimizes the processed data to generate optimized features, and post-processes the optimized features to generate device controls/settings. Each IoT device 102 uses the device controls/settings to control the associated sensors/actuators 130. As further described below, each IoT device 102 selects an optimization strategy to determine whether the pre-processing, optimization, and/or post-processing operations are to be executed locally by the IoT device 102 or globally by the optimization server 104. As described further below, the pre-processing, optimization, and post-processing operations are performed using a set of plugins that may be executed locally by the IoT devices 102 or globally by the optimization server 104 (in parallel or otherwise at scale). Thus, the system 100 may adapt the location of various optimization operations to changing device conditions and/or user preferences (such as privacy policies), while still providing the enhanced performance and power efficiency of a cloud-based optimization solution. Additionally, the system 100 allows users to easily configure user preferences, such as power management, privacy, and whether to participate in global optimization, for large communities of IoT devices 102. Further, the system 100 may improve development and maintenance efficiency because the system 100 may adapt to process data locally or globally without requiring additional system development, and the same computer code may be used for both local and global processing.

Each IoT device 102 may be embodied as any type of computation or computer device capable of performing the functions described herein, including, without limitation, an embedded computing device, an IoT gateway, a sensor, a manufactured part, a manufactured assembly, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the IoT device 102 illustratively includes a processor 120, an input/output subsystem 122, a memory 124, a data storage device 126, and a communication subsystem 128. Of course, the IoT device 102 may include other or additional components, such as those commonly found in an embedded computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the IoT device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the IoT device 102. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the IoT device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the IoT device 102 may be embodied as any communication circuit, device, or collection thereof, capable of enabling communications between the IoT device 102 and other remote devices over a network. The communication subsystem 128 may be configured to use any one or more communication technology (e.g., wired or wireless communications) and associated protocols (e.g., Ethernet, Bluetooth®, Wi-Fi®, WiMAX, ZigBee®, Z-Wave®, etc.) to effect such communication. As discussed in more detail below in regard to FIG. 7, those technologies may be used to establish a mesh network between the example subsystem 128 and other devices, as well as external networks.

Each IoT device 102 may include one or more sensors or actuators 130. Each sensor/actuator 130 may be embodied as, for example, a motion sensor, temperature sensor, power sensor, environmental sensor, building management sensor, building automation sensor, electric vehicle, or sensor fusion device, and/or a building management actuator, building automation actuator, machine actuator, controller, or other control circuit. The sensor/actuator 130 may be physically incorporated and/or coupled to the IoT device 102, or in some embodiments may be connected to the IoT device 102 over a network connection or other communication link. In some embodiments, the sensor/actuator 130 may be embodied as a sensor or actuator end node that includes the sensor/actuator 130 coupled with a microcontroller and external communications. For example, the illustrative IoT device 102a includes a sensor/actuator 130 and the illustrative IoT device 102b is externally coupled to a sensor/actuator 130 end node via a short-range communication link. As described further below, the IoT device 102 collects raw data from the sensor/actuator 130 such as sensor data, actuator control data, or other data produced by the sensor/actuator 130. The IoT device 102 also may program or otherwise provides the sensor/actuator 130 with device settings or other device control data.

As shown, each IoT device 102 may also include one or more peripheral devices 132. The peripheral devices 132 may include any number of additional input/output devices, interface devices, sensors, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

The optimization server 104 may be embodied as any type of computation or computer device capable of performing the functions described herein, including, without limitation, a computer, a multiprocessor system, a server, a rack-mounted server, a blade server, a network appliance, a distributed computing system, a processor-based system, and/or a consumer electronic device. As such, the optimization server 104 may be embodied as a single server computing device or a collection of servers and associated devices. For example, in some embodiments, the optimization server 104 may be embodied as a "virtual server" formed from multiple computing devices distributed across the network 106 and operating in a public or private cloud. Accordingly, although the optimization server 104 is illustrated in FIG. 1 and described below as embodied as a single server computing device, it should be appreciated that the optimization server 104 may be embodied as multiple devices cooperating together to facilitate the functionality described below. The optimization server 104 may include a processor 140, an I/O subsystem 142, a memory 144, a data storage device 146, a communication subsystem 148, peripheral devices 150, and/or other components and devices commonly found in a server or similar computing device. Those individual components of the optimization server 104 may be similar to the corresponding components of the IoT device 102, the description of which is applicable to the corresponding components of the optimization server 104 and is not repeated herein so as not to obscure the present disclosure.

As discussed in more detail below, the IoT devices 102 and the optimization server 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a low power wide area network (LPWAN) such as LoRaWAN™, SIGFOX, etc., a controller-area network, a cellular network, and/or a publicly-accessible, global network such as the Internet. As such, the network 106 may include any number of additional devices, such as additional computers, routers, and switches, to facilitate communications among the devices of the system 100.

Figure 2:
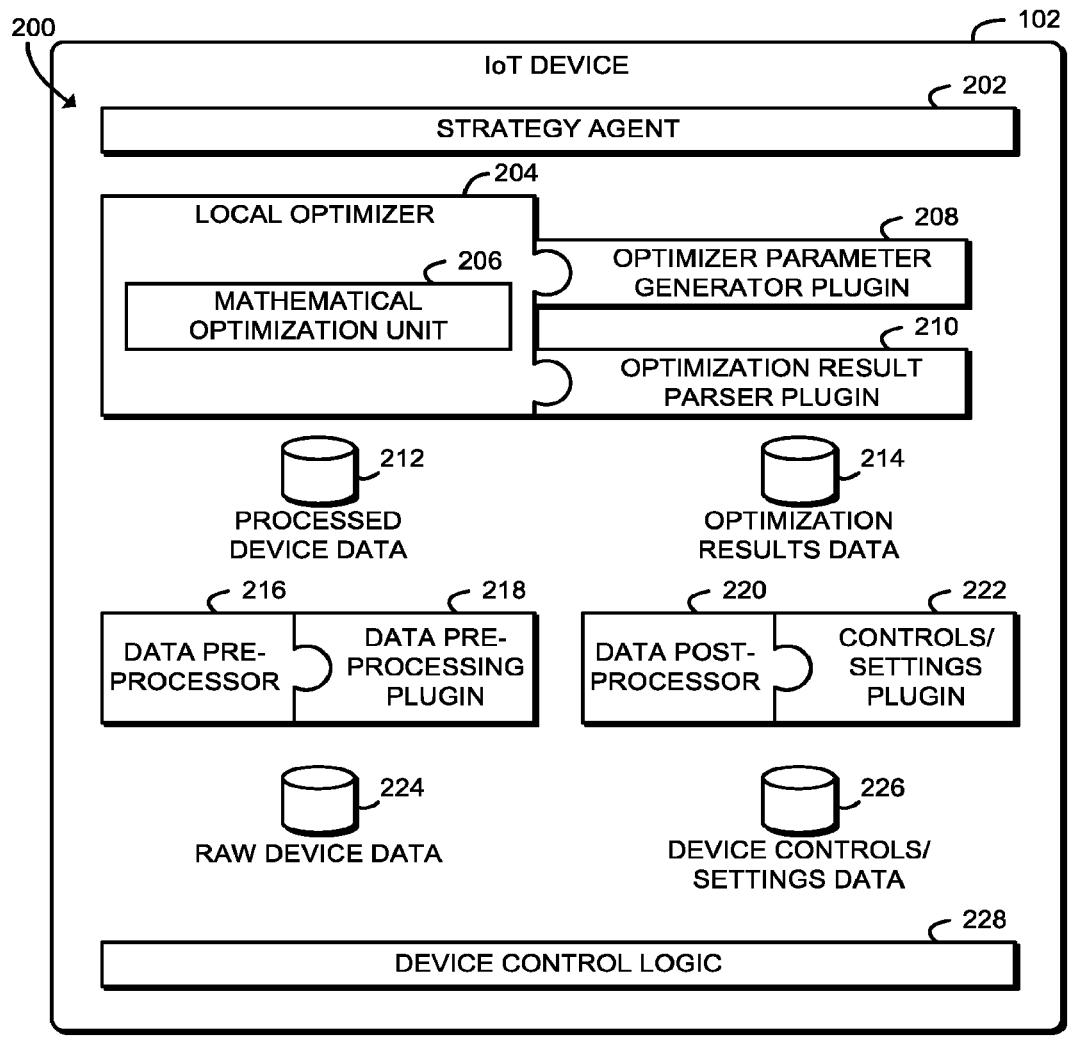
FIG. 2 is a simplified block diagram of an environment that may be established by an Internet-of-Things device of the system of FIG. 1.

Referring now to FIG. 2, in an illustrative embodiment, each IoT device 102 establishes an environment 200 during operation. The illustrative environment 200 includes a strategy agent 202, a local optimizer 204, a data pre-processor 216, a data post-processor 220, and device control logic 228. The various components of the environment 200 may be embodied as hardware, firmware, software, or a combination thereof. As such, in some embodiments, one or more of the components of the environment 200 may be embodied as circuitry or collection of electrical devices (e.g., strategy agent circuitry 202, local optimizer circuitry 204, data pre-processor circuitry 216, data post-processor circuitry 220, and/or device control logic circuitry 228). It should be appreciated that, in such embodiments, one or more of the strategy agent circuitry 202, the local optimizer circuitry 204, the data pre-processor circuitry 216, the data post-processor circuitry 220, and/or the device control logic circuitry 228) may form a portion of the processor 120, the I/O subsystem 122, and/or other components of the IoT device 102. Additionally, in some embodiments, one or more of the illustrative components may form a portion of another component and/or one or more of the illustrative components may be independent of one another.

The strategy agent 202 is configured to select an optimization strategy based on a device context of the IoT device 102 and one or more user preferences. The optimization strategy may include a full-local optimization strategy, a hybrid optimization strategy, or a full-global optimization strategy.

The device control logic 228 is configured to receive raw device data from one or more sensors/actuators 130 coupled to the IoT device 102. The device control logic 228 is further configured to provide device controls/settings, generated as described below, to the sensors/actuators 130. The device control logic 228 may be further configured to store the raw device data in a raw device data 224 of the IoT device 102 in response to receiving the raw device data if the full-local optimization strategy and/or the hybrid optimization strategy is selected.

The data pre-processor 216 is configured to execute a data pre-processing plugin 218 to generate processed data based on the raw device data in response to selection of the full-local optimization strategy and/or in response to selection of the hybrid optimization strategy. The data pre-processor 216 may be further configured to store the processed data in processed device data 212 in response to executing the data pre-processing plugin if the full-local optimization strategy is selected.

The local optimizer 204 is configured to generate optimization results based on the processed data in response to selecting the full-local optimization strategy. Generating the optimization results includes executing an optimizer parameter generator plugin 208 to generate input parameters based on the processed data, executing a mathematical optimization unit 206 to generate a vector of optimized features based on the input parameters, and executing an optimization result parser plugin 210 to generate the optimization results based on the vector of optimized features. The local optimizer 204 may be further configured to store the optimization results in optimization results data 214 in response generating the optimization results if the full-local optimization strategy is selected.

The data post-processor 220 is configured to execute a device controls/settings plugin 222 to generate device controls/settings for the sensors/actuators 130 based on the optimization results in response selecting the full-local optimization strategy and/or in response to selecting the hybrid optimization strategy. The data post-processor 220 may be further configured to store the device/control settings in device controls/settings data 226 in response to executing of the device controls/settings plugin 222 if the full-local optimization strategy and/or the hybrid optimization strategy is selected.

The strategy agent 202 may be further configured to transmit the processed data to the optimization server 104 in response to selecting the hybrid optimization strategy and to receive the optimization results from the optimization server 104 in response to transmitting the processed data. The strategy agent 202 may be further configured to transmit the raw device data to the optimization server 104 in response selecting the full-global optimization strategy and to receive the device controls/settings from the optimization server 104 in response to transmitting the raw device data.

Each of the plugins (i.e., the data pre-processing plugin 218, the optimizer parameter generator plugin 208, the optimization result parser plugin 210, and the device controls/settings plugin 222) may be embodied as any form of computer code executable by the IoT devices 102 and the optimization server 104, such as computer-interpretable scripts, compiled computer code, virtual machine code, virtualized containers or virtual machines, and/or other executable code. Each of the plugins implements a predetermined set of external interfaces (e.g., application programming interfaces).

Figure 3:
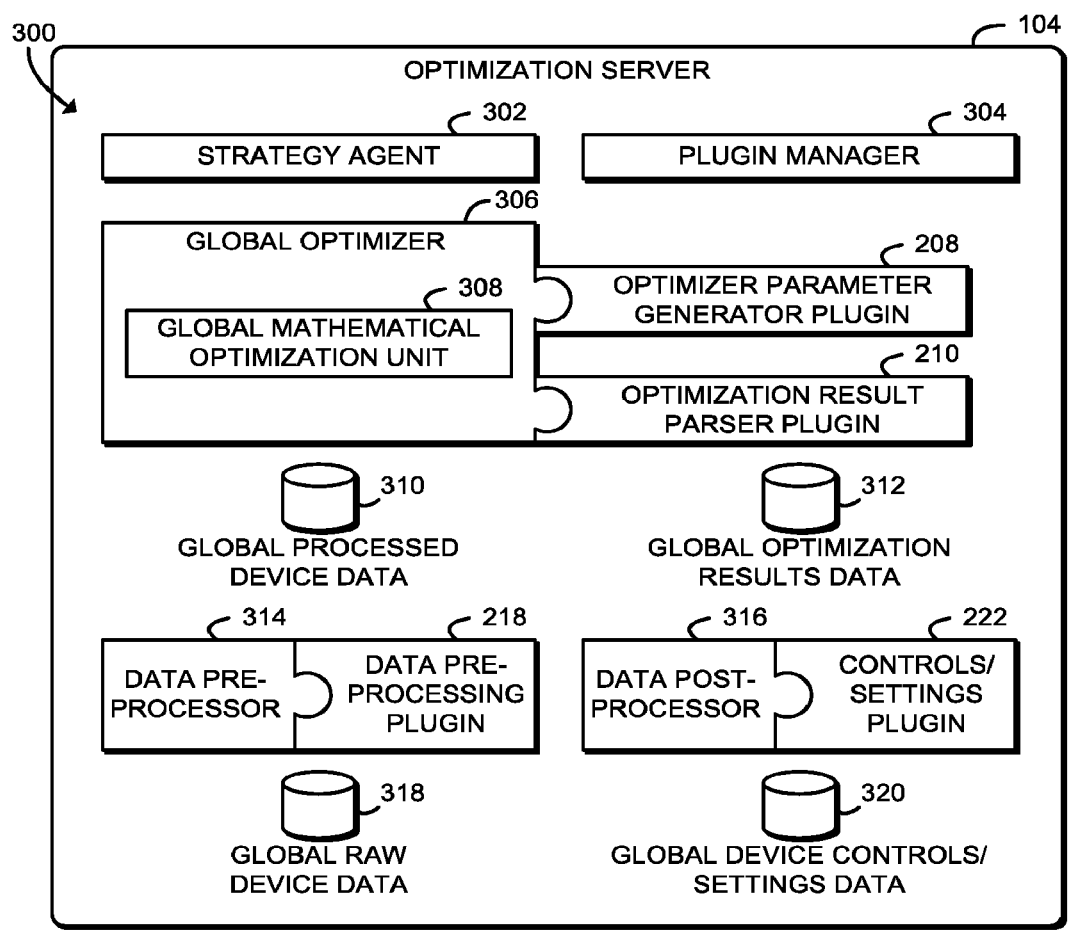
FIG. 3 is a simplified block diagram of an environment that may be established by an optimization server of the system of FIG. 1.

Referring now to FIG. 3, in the illustrative embodiment, the optimization server 104 establishes an environment 300 during operation. The illustrative environment 300 includes a strategy agent 302, a plugin manager 304, a global optimizer 306, a data pre-processor 314, and a data post-processor 316. The various components of the environment 300 may be embodied as hardware, firmware, software, or a combination thereof. As such, in some embodiments, one or more of the components of the environment 300 may be embodied as circuitry or collection of electrical devices (e.g., strategy agent circuitry 302, plugin manager circuitry 304, global optimizer circuitry 306, data pre-processor circuitry 314, and/or data post-processor circuitry 316). It should be appreciated that, in such embodiments, one or more of the strategy agent circuitry 302, the plugin manager circuitry 304, the global optimizer circuitry 306, the data pre-processor circuitry 314, and/or the data post-processor circuitry 316 may form a portion of the processor 140, the I/O subsystem 142, and/or other components of the optimization server 104. Additionally, in some embodiments, one or more of the illustrative components may form a portion of another component and/or one or more of the illustrative components may be independent of one another.

The global optimizer 306 is configured to execute the optimizer parameter generator plugin 208 to generate input parameters based on processed data associated with multiple IoT devices 102. The global optimizer 306 is further configured to execute a global mathematical optimization unit 308 to generate a vector of optimized features based on the input parameters and to execute the optimization result parser plugin 210 to generate optimization results based on the vector of optimized features. The optimization results are associated with the IoT devices 102. The optimization results may be stored in global optimization results data 312.

The data pre-processor 314 is configured to execute the data pre-processing plugin 218 to generate processed data based on raw device data associated with the IoT devices 102. The raw device data is generated by one or more sensors/actuators 130 coupled to each of the IoT devices 102. The raw device data may be stored in raw device data 318, and the processed data may be stored in global processed device data 310.

The data post-processor 316 is configured to execute the device controls/settings plugin 222 to generate device controls/settings for the one or more sensors/actuators 130 of the IoT devices 102 based on the optimization results in response to executing the optimization result parser plugin 210. The device controls/settings may be stored in global device controls/settings data 320.

The strategy agent 302 may be configured to receive the processed data from the IoT devices 102 and to send the optimization results to the IoT devices 102. The strategy agent 302 may be further configured to receive the raw device data from the IoT devices 102 and to send the device controls/settings to the IoT devices 102.

The plugin manager 304 is configured to provision the optimizer parameter generator plugin 208, the optimization result parser plugin 210, the data pre-processing plugin 218, and/or the device controls/settings plugin 222 to the IoT devices 102. As described above, each of the plugins (i.e., the data pre-processing plugin 218, the optimizer parameter generator plugin 208, the optimization result parser plugin 210, and the device controls/settings plugin 222) may be embodied as any form of computer code executable by the IoT devices 102 and the optimization server 104, such as computer-interpretable scripts, compiled computer code, virtual machine code, virtualized containers or virtual machines, and/or other executable code. Each of the plugins implements a pre-determined set of external interfaces (e.g., application programming interfaces).

Figure 4:
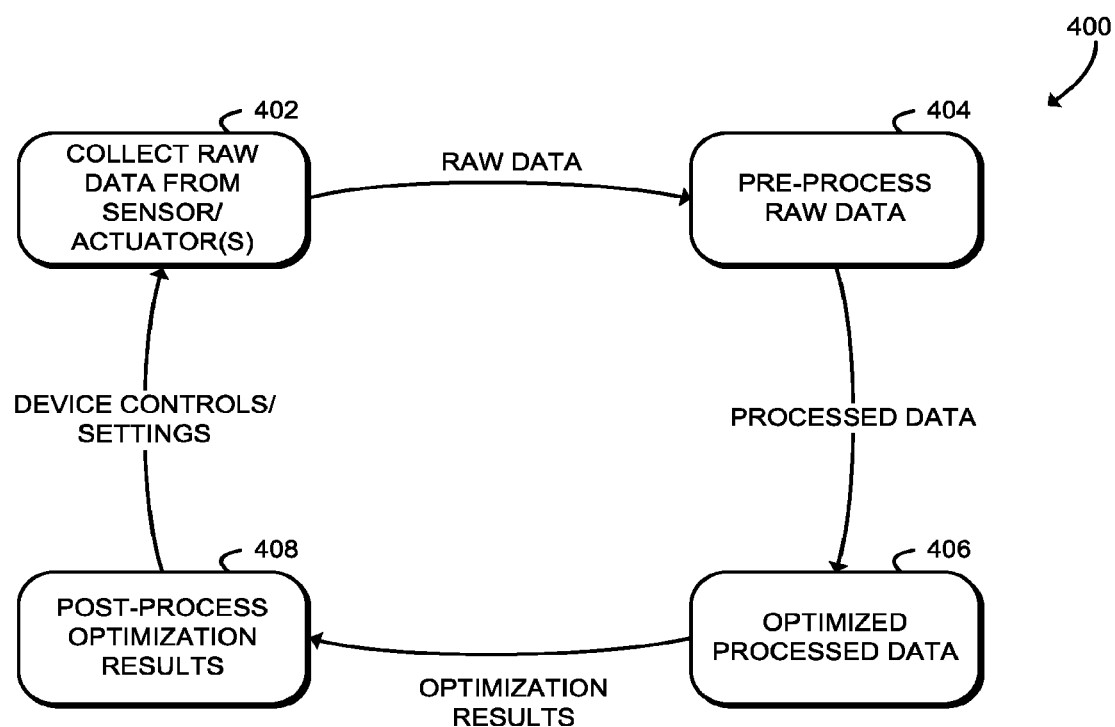
FIG. 4 is a conceptual diagram illustrating an overview of an optimization process that may be performed by the system of FIGS. 1-3.

Referring now to FIG. 4, conceptual diagram 400 illustrates an overview of an optimization process that may be performed by the system 100. In block 402, the system 100 collects raw device data from the sensors/actuators 130 coupled to the IoT devices 102. In block 404, the system 100 pre-processes the raw data to generate processed data. Depending on the optimization strategy selected by each IoT device 102, the pre-processing may be performed by the IoT device 102 or may be performed globally by the optimization server 104. In block 406, the system 100 optimizes the processed data to generate optimization results. Depending on the optimization strategy selected by each IoT device 102, the optimization may be performed by the IoT device 102 or may be performed globally by the optimization server 104. In block 408, the system 100 post-processes the optimization results to generate device-specific controls and/or settings. Depending on the optimization strategy selected by each IoT device 102, the post-processing may be performed by the IoT device 102 or may be performed globally by the optimization server 104. Each IoT device 102 provides the device controls/settings to the associated sensors/actuators 130 and then may continue to collect raw device data.

Figure 5A:
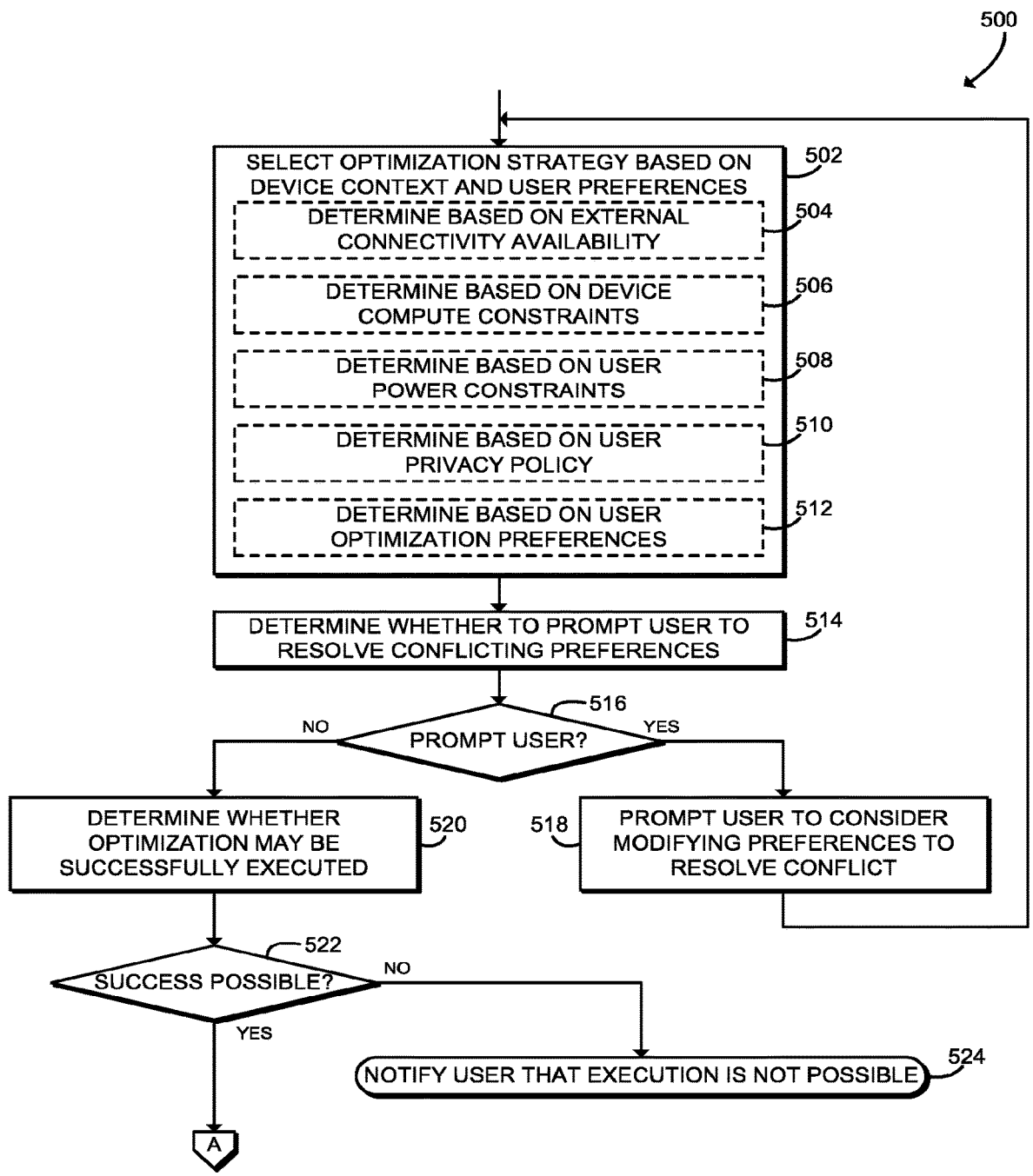
FIGS. 5A and 5B are a simplified flow diagram of at least one embodiment of a method for collaborative optimization that may be executed by an Internet-of-Things device of the system of FIGS. 1-3.
Figure 5B:
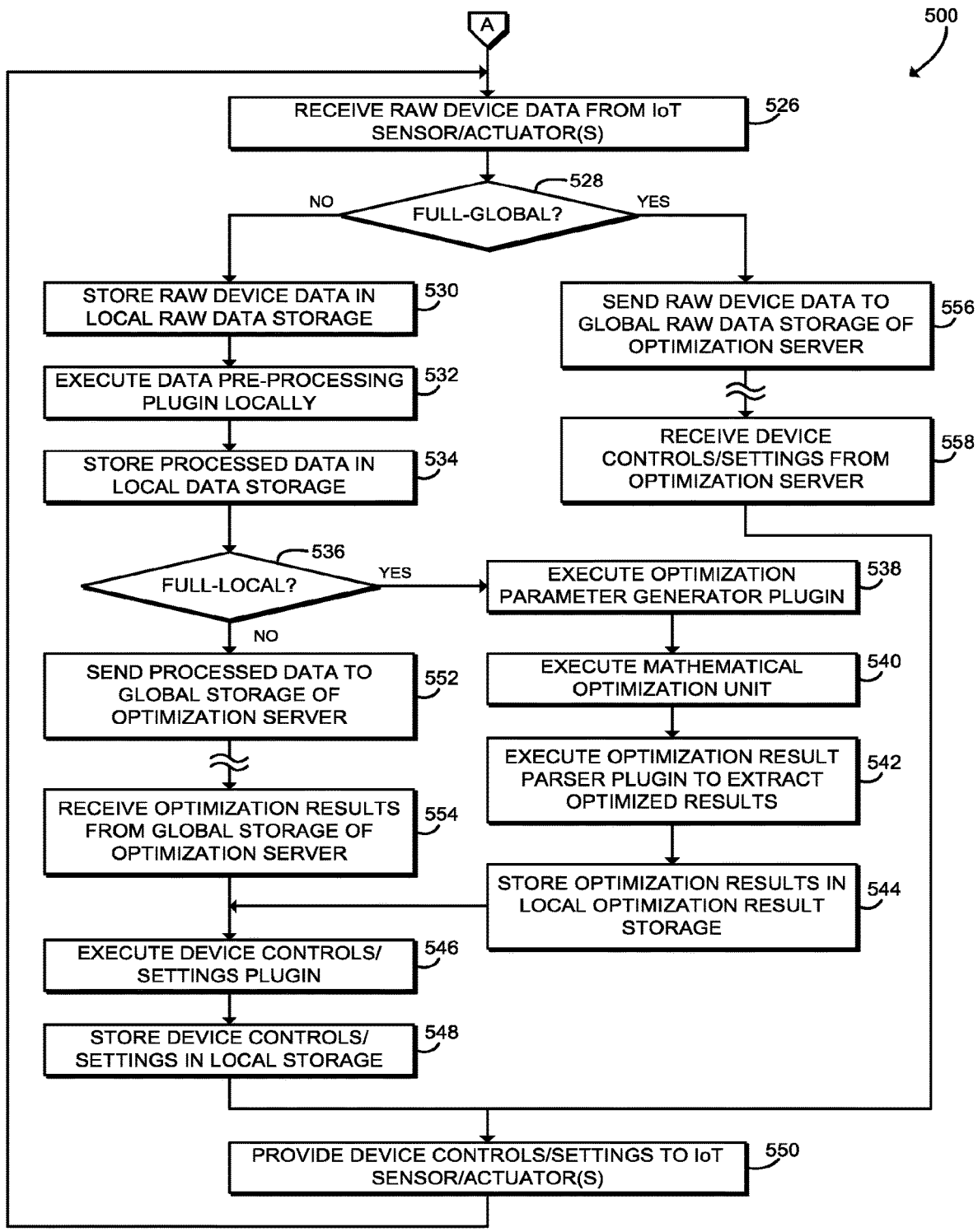

Referring now to FIGS. 5A and 5B, in use, each IoT device 102 may execute a method 500 for collaborative optimization. It should be appreciated that, in some embodiments, the method 500 may be embodied as various instructions stored on a computer-readable media, which may be executed by the processor 120, the I/O subsystem 122, and/or other components of the IoT device 102 to cause the IoT device 102 to perform the method 500. The computer-readable media may be embodied as any type of media capable of being read by the IoT device 102 including, but not limited to, the memory 124, the data storage device 126, firmware devices, and/or other media. Additionally or alternatively, it should be appreciated that, in some embodiments, the operations of the method 500 may be performed by one or more components of the environment 200 of the IoT device 102 as shown in FIG. 2.

The method 500 begins in block 502, in which the IoT device 102 selects an optimization strategy based on its device context and any applicable user policies. In particular, the IoT device 102 may select between a full-local optimization strategy, a full-global optimization strategy, and a hybrid optimization strategy. The full-local strategy causes data pre-processing, optimization, and post-processing to be performed locally by the IoT device 102, the full-global strategy causes data pre-processing, optimization, and post-processing to be performed globally by the optimization server 104 (and in some embodiments with data from other IoT devices 102), and the hybrid strategy causes data pre-processing and post-processing to be performed locally by the IoT device 102 and optimization to be performed globally by the optimization server 104. The IoT device 102 may use any heuristic, rule set, or other predetermined algorithm to select the optimization strategy based on one or more device context factors and/or user preferences or policies. The user preferences may be acquired from the user, for example, by a mobile computing device that relays user preferences to the IoT device 102, which then persists the preferences. As another example, the IoT device 102 may be pre-configured with the user preferences, for example with one or more configuration files.

In some embodiments, in block 504 the IoT device 102 may select the optimization strategy based on whether external network connectivity is available. For example, the IoT device 102 may only select the hybrid strategy or the full-global strategy if external network connectivity is available to reach the optimization server 104. Because external network connectivity may vary unpredictably, the IoT device 102 may re-select the optimization strategy in order to adapt to changing network conditions. In some embodiments, in block 506 the IoT device 102 may select the optimization strategy based on device compute constraints. For example, the IoT device 102 may select the full-local strategy or the hybrid strategy only if sufficient compute resources (e.g., available processor 120 capacity) are available to perform the pre-processing, optimization, and/or post-processing operations locally. The IoT device 102 may determine the device compute constraints based on, for example, the processor 120 capacity available after performing user interactions or otherwise providing services to the user.

In some embodiments, in block 508 the IoT device 102 may select the optimization strategy based on user power constraints, such as maximum specified power consumption. For example, the IoT device 102 may select the full-local strategy or the hybrid strategy only if the IoT device 102 may perform the pre-processing, optimization, and/or post-processing operations locally within a user-specified power constraint. The user may base the user power constraint on factors such as energy costs. Thus, in some embodiments the user power constraint may be lower during times when energy costs are high (e.g., during electricity peak demand hours).

In some embodiments, in block 510, the IoT device 102 may select the optimization strategy based on a user privacy policy. The user may specify, for example, that no device data may be transmitted over the network 106 to the optimization server 104, that only processed device data may be transmitted over the network 106 to the optimization server 104, or that any device data (i.e., including raw device data) may be transmitted over the network 106 to the optimization server 104. Continuing that example, the IoT device 102 may select the full-local strategy if no data may be transmitted, the hybrid strategy if processed data may be transmitted, and the full-global strategy if raw data may be transmitted. In some embodiments, in block 512 the IoT device 102 may select the optimization strategy based on a user optimization preference such as a preference of whether to participate in global optimization if available. For example, the IoT device 102 may select the hybrid strategy or the full-global strategy only if the user has indicated to participate in global optimization.

In block 514, the IoT device 102 determines whether to prompt the user to resolve conflicting preferences. In some embodiments, various combinations of device context and user preferences may not allow for selection of an optimization strategy. For example, a conflict may exist if no external connectivity is available and the user power constraints cannot be satisfied. As another example, a conflict may exist if the user power constraints or the device compute constraints cannot be satisfied and the user has indicated not to participate in global optimization or that certain data should not be transmitted to the optimization server 104. In block 516, the IoT device 102 checks whether the user should be prompted. If not, the method 500 branches to block 520, described below. If the user should be prompted, the method 500 branches to block 518.

In block 518, the IoT device 102 prompts the user to consider modifying one or more user preferences to resolve a conflict. The IoT device 102 may use any technique to prompt the user, including sending a message or other notification to the mobile computing device associated with the user. The IoT device 102 may prompt the user to reconsider user power constraints, for example, if no external connectivity is available and if the power constraints would be exceeded and/or if the user has indicated not to participate in global optimization and if the user power constraints would be exceeded. The IoT device 102 may prompt the user to reconsider privacy settings if the device compute constraints would be exceeded and the privacy policy prohibits transmitting processed data and/or raw data to the optimization server 104 and/or if the user indicates to participate in global optimization and the privacy policy prohibits transmitting any data to the optimization server 104. The IoT device 102 may prompt the user to reconsider whether to participate in global optimization if the user indicates to participate in global optimization and external connectivity is unavailable; and/or if the user indicates not to participate in global optimization and the user power constraints and/or the device compute constraints would be exceeded. The implications caused by changing the user preferences (e.g., changes in cost, performance, privacy, etc.) should also be presented to the user. For example, changing privacy settings to minimize transmission of data may increase the amount of processing performed locally, which could in turn increase energy bills. The cost of energy for algorithm execution on the IoT device 102 over time, coupled with the empirically known frequency of algorithm execution may allow the cost difference to be presented to the user when changing the privacy settings. As another example, participating in global optimization may provide performance and application-specific financial benefits that do not occur if participating only in local optimization. After prompting the user, the user may modify one or more user preferences. The method 500 loops back to block 502 to re-reselect the optimization strategy.

Referring back to block 516, if the IoT device 102 determines not to prompt the user, the method 500 branches to block 520, in which the IoT device 102 determines whether optimization may be successfully executed based on the current device context and/or user preferences. For example, the IoT device 102 may determines that optimization may not be successfully completed if external connectivity is not available and the device compute constraints would be exceeded. In block 522, the IoT device 102 checks whether successful optimization is possible. If not, the method 500 branches to block 524, in which the IoT device 102 notifies the user and/or other stakeholders that execution is not possible. After notifying the stakeholders, the method 500 is completed. Referring back to block 522, if successful optimization is possible using the selected optimization strategy, the method 500 branches to block 526, shown in FIG. 5B.

As described above, the IoT device 102 may execute any heuristic or other algorithm to select the optimization strategy. In the illustrative embodiment, the IoT device 102 may begin by determining whether external connectivity is available. If not, the IoT device 102 may determine whether user power constraints would be exceeded by performing the data pre-processing, optimization, and/or post-processing operations. If so, the IoT device 102 may prompt the user to reconsider power usage constraints settings. If power usage constraints would not be exceeded, the IoT device 102 may determine whether device compute constraints would be exceeded by performing the data pre-processing, optimization, and/or post-processing operations. If so, the IoT device 102 may notify stakeholders that optimization may not be successfully executed. If device compute constraints would not be exceeded, the IoT device 102 may determine whether the user had indicated whether to participate in global optimization. If not, the IoT device 102 may select the full-local optimization strategy. If the user has indicated to participate in global optimization, the IoT device 102 may prompt the user to reconsider whether to participate in global optimization.

If external connectivity is available, the IoT device 102 may examine user privacy settings. If the user privacy settings prohibit transmitting any data to the optimization server 104, the IoT device 102 may determine whether the user has indicated to participate in global optimization. If so, the IoT device 102 may prompt the user to reconsider the privacy settings and/or whether to participate in global optimization. If the user has indicated not to participate in global optimization, the IoT device 102 may determine whether user power constraints would be exceeded by performing the data pre-processing, optimization, and/or post-processing operations. If so, the IoT device 102 may prompt the user to reconsider the user power constraints and/or the privacy settings. If the user power constraints would not be exceeded, the IoT device 102 may determine whether device compute constrains would be exceeded by performing the data pre-processing, optimization, and/or post-processing operations. If so, the IoT device 102 may prompt the user to reconsider the privacy settings. If the device compute constraints would not be exceeded, the IoT device 102 may select the full-local optimization strategy.

If external connectivity is available and the user privacy settings allow transmission of only processed data, the IoT device 102 may determine whether the user has indicated to participate in global optimization. If not, the IoT device 102 may determine whether user power constraints would be exceeded by performing the data pre-processing, optimization, and/or post-processing operations. If so, the IoT device 102 may prompt the user to reconsider whether to participate in global optimization and/or the user power constraints. If the user power constraints would not be exceeded, the IoT device 102 may determine whether device compute constraints would be exceeded by performing the data pre-processing, optimization, and/or post-processing operations. If so, the IoT device 102 may prompt the user to reconsider whether to participate in global optimization and/or the user privacy settings. If the device compute constraints would not be exceeded, the IoT device 102 may select the full-local optimization strategy.

If external connectivity is available, the user privacy settings allow transmission of only processed data, and the user has indicated to participate in global optimization, the IoT device 102 may determine whether user power constraints would be exceeded by performing the data pre-processing, optimization, and/or post-processing operations. If so, the IoT device 102 may prompt the user to reconsider the privacy settings and/or the user power constraints. If the user power constraints would not be exceeded, the IoT device 102 may determine whether device compute constraints would be exceeded by performing the data pre-processing, optimization, and/or post-processing operations. If so, the IoT device 102 may prompt the user to reconsider the privacy settings. If the device compute constraints would not be exceeded, the IoT device 102 may select the hybrid optimization strategy.

If external connectivity is available and the user privacy settings allow transmission of any data to the optimization server 104, the IoT device 102 may determine whether the user has indicated to participate in global optimization. If not, the IoT device 102 may determine whether user power constraints would be exceeded by performing the data pre-processing, optimization, and/or post-processing operations. If so, the IoT device 102 may prompt the user to reconsider whether to participate in global optimization and/or the user power constraints. If the user power constraints would not be exceeded, the IoT device 102 may determine whether device compute constraints would be exceeded by performing the data pre-processing, optimization, and/or post-processing operations. If so, the IoT device 102 may prompt the user to reconsider whether to participate in global optimization and/or the user privacy settings. If the device compute constraints would not be exceeded, the IoT device 102 may select the full-local optimization strategy.

If external connectivity is available, the user privacy settings allow transmission of any data to the optimization server 104, and the user has indicated to participate in global optimization, the IoT device 102 may determine whether user power constraints would be exceeded by performing the data pre-processing, optimization, and/or post-processing operations. If so, the IoT device 102 may select the full-global optimization strategy. If the user power constraints would not be exceeded, the IoT device 102 may determine whether device compute constraints would be exceeded by performing the data pre-processing, optimization, and/or post-processing operations. If so, the IoT device 102 may select the full-global optimization strategy. If the device compute constraints would not be exceeded, the IoT device 102 may select the hybrid optimization strategy.

Additionally or alternatively, other techniques may be used to select the optimization strategy, particularly when user-specified features are more complex. For example, the user may request to keep algorithm execution energy costs on the IoT device 102 below a particular cost of energy per month. In that example, a metaheuristic optimization algorithm may be run on the IoT device 102 to determine the optimal set of optimization strategies (full-local, hybrid, or full-global) to be used over time to satisfy the user's constraints while minimizing the total cost of running the optimization server 104.

The illustrated algorithm for selecting optimization strategy may be executed entirely locally by each IoT device 102 with negligible processing costs. In some embodiments, by extending the system 100 to permit the strategy for the IoT devices 102 to be dictated externally from each IoT device 102, a large-scale metaheuristic algorithm (as opposed to evaluating logic independently on each IoT device 102) may take in the user preferences and device context of all IoT devices 102 and centrally decide on the individual optimization strategies over time for each IoT device 102. In those embodiments, the system 100 may detect scenarios when it would be beneficial to move processing from one IoT device 102 to another IoT device 102. For example, processing for a low-powered IoT device 102 may be delegated to another, high-powered, IoT device 102, while still honoring the preferences of the high-powered IoT device 102 owner. In such a delegation-to-another-device scenario, the source IoT device 102 may give ownership of its data to the central server and the central server may delegate ownership of the data to the other IoT device 102 tasked with the proxy execution of algorithms for the original IoT device 102.

Referring now to FIG. 5B, after selecting an optimization strategy, the method 500 branches to block 526, in which the IoT device 102 receives raw data from one or more sensors/actuators 130. As described above, the raw data may be embodied as any raw data received from the sensor/actuator 130, such as sensor data, actuator control data, or other data produced by the sensor/actuator 130.

In block 528, the IoT device 102 determines whether the full-global optimization strategy has been selected. If so, the method 500 branches to block 556, described below. If the full-global strategy has not been selected (i.e., if the full-local strategy or the hybrid strategy has been selected), the method 500 branches to block 530.

In block 530, the IoT device 102 stores the raw data from the sensors/actuators 130 in the local raw device data 224. In block 532, the IoT device 102 executes the data pre-processing plugin 218 locally, using compute resources of the IoT device 102. The data pre-processing plugin 218 performs data processing that applies to the raw device data from a single IoT device 102, independent of all other IoT devices 102, and generates processed data based on the raw device data. In some embodiments, the data pre-processing plugin 218 may also use one or more external data sources. For example, the data pre-processing plugin 218 may extract patterns in device usage which indicate device usage flexibility. The data pre-processing plugin 218 may be executed by the IoT device 102 as a single-threaded process. The data pre-processing plugin 218. In block 534, the IoT device 102 stores the processed data in the local processed device data 212.

In block 536, the IoT device 102 determines whether the full-local optimization strategy has been selected. If not (i.e., if the hybrid optimization strategy was selected), the method 500 branches to block 552, described below. If the full-local optimization strategy was selected, the method 500 branches to block 538.

In block 538, the IoT device 102 executes the optimizer parameter generator plugin 208 locally using compute resources of the IoT device 102. The optimizer parameter generator plugin 208 transforms, translates, or otherwise processes the processed data to generate features, constraints, and/or other optimization parameters that may be processed by the mathematical optimization unit 206. For example, the optimizer parameter generator plugin 208 provides the optimization objective function and generates data that may be used by the objective function during optimization objective function evaluation. The optimizer parameter generator plugin 208 may also generate feature sets such as initial optimization features, optimization bounds, optimization linear equalities and inequalities, and the optimization non-linear inequality functions. The optimization parameters are each generated as a function of the processed data from a single IoT device 102. The optimizer parameter generator plugin 208 may be implemented as a function that may process data from any number of IoT devices 102. Thus, the optimizer parameter generator plugin 208 may be executed by the IoT device 102 locally for one device or by the optimization server 104 globally for multiple IoT devices 102.

In block 540, the IoT device 102 executes the mathematical optimization unit 206 locally using compute resources of the IoT device 102. The mathematical optimization unit 206 may execute any machine learning algorithm using the optimization parameters as input. The mathematical optimization unit 206 illustratively executes as a single-threaded machine learning operation. The mathematical optimization unit 206 generates a vector of optimized features based on the input optimization parameters.

In block 542, the IoT device 102 executes the optimization result parser plugin 210 locally using compute resources of the IoT device 102. The optimization result parser plugin 210 extracts optimization results from the vector of optimized features. In particular, the optimization result parser plugin 210 may split the vector of optimized features into a sub-list of features for each IoT device 102. For example, the vector of optimized features may include five features for each IoT device 102, and the optimization result parser plugin 210 may split the vector into blocks of five features each. The optimization result parser plugin 210 may be implemented as a function that may process data from any number of IoT devices 102. Thus, the optimization result parser plugin 210 may be executed by the IoT device 102 locally for one device or by the optimization server 104 globally for multiple IoT devices 102. In block 544, the IoT device 102 stores the optimization results in the local optimization results data 214. After storing the optimization results, the method 500 advances to block 546.

In block 546, the IoT device 102 executes the device controls/settings plugin 222. The device controls/settings plugin 222 transforms, translates, or otherwise processes the optimization results to generate device settings/controls for the sensors/actuators 130. The device settings/controls may be embodied as settings that the IoT device 102 can interpret and act upon, as controls that the IoT device 102 can relay to the sensors/actuators 130, and/or as any other meaningful device controls/settings that may be applied to the IoT device 102. For example, the IoT device 102 may convert a set of optimized features into a set of actionable controls to execute on the sensors/actuators 130 over time. The device controls/settings plugin 222 performs data processing that applies to the device settings/controls for a single IoT device 102, and is illustratively executed by the IoT device 102 as a single-threaded process. In block 548 the IoT device 102 stores the generated device controls/settings in the device controls/settings data 226. After storing the device controls/settings, the method 500 advances to block 550.

In block 550, the IoT device 102 provides the device controls/settings to the sensors/actuators 130 of the IoT device 102. After providing the device controls/settings, the method 500 loops back to block 526 to continue capturing and optimizing raw device data.

Referring back to block 536, if the IoT device 102 determines that the full-local optimization strategy was not selected (i.e., if the hybrid optimization strategy was selected), the method 500 branches to block 552. In block 552, the IoT device 102 sends the processed data to the global processed device data 310 of the optimization server 104. The processed data may be sent using any appropriate communication protocol, such as REST, XMPP, MQTT, ZeroMQ, RabbitMQ, WebSockets, OpenADR, ICCP, or other communication protocol. As described below, the optimization server 104 performs the optimization operation on the processed data and generates optimization results.

After optimization has been performed by the optimization server 104, in block 554 the IoT device 102 receives optimization results from the global optimization results data 312 of the optimization server 104. The optimization results may be embodied block of optimized features associated with the IoT device 102, as described above in connection with block 542. The optimization results may be received using any appropriate communication protocol, as described above. After receiving the optimization results, the method 500 advances to block 546, in which the IoT device 102 executes the device controls/settings plugin 222 as described above.

Referring back to block 528, if the IoT device 102 determines that the full-global optimization strategy was selected, the method 500 branches to block 556, in which the IoT device 102 sends the raw device data to the global raw device data 318 of the optimization server 104. The raw device data may be sent using any appropriate communication protocol, as described above. As described below, the optimization server 104 performs the pre-processing, optimization, and post-processing operations on the raw data and generates device controls/settings. After post-processing has been performed by the optimization server 104, in block 558 the IoT device 102 receives the device controls/settings from the global device controls/settings data 320 of the optimization server 104. The device controls/settings may be received using any appropriate communication protocol, as described above. After receiving the device controls/settings, the method 500 advances to block 550, in which the IoT device 102 provides the device controls/settings to the sensors/actuators 130 as described above.

Although illustrated in FIGS. 5A and 5B as selecting and executing a single optimization strategy, it should be understood that each IoT device 102 may change between optimization strategies, for example in response to changes in device context and/or changes in user preferences. When changing to an optimization strategy which requires more data on the optimization server 104 for a particular IoT device 102 than the previous optimization strategy, that data may be copied from the IoT device 102 to the optimization server 104, and future data may be pushed to the optimization server 104 thereafter. For example, when moving from the full-local optimization strategy to the hybrid optimization strategy, the contents of the processed device data 212 and the optimization results data 214 may be copied to the optimization server 104, and the results of future processing steps will communicate with the corresponding global databases. Similarly, when changing to an optimization strategy which requires less data in the global databases, data may be copied from the global databases to the local databases of the IoT device 102 which does not already exist in the local databases. After copying, all data in the global database relevant to the IoT device 102 changing its optimization strategy may be deleted.

Figure 6A:
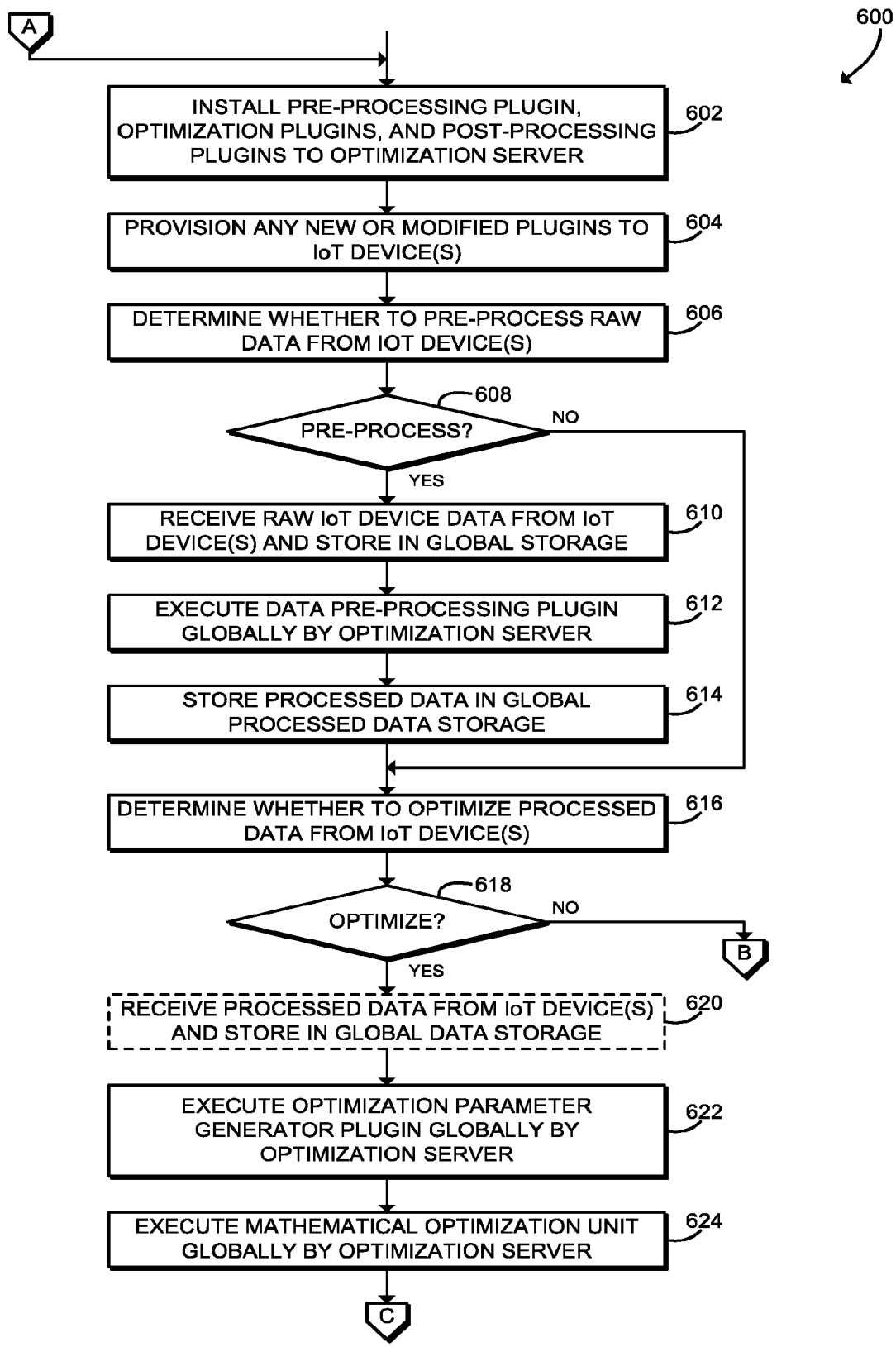
FIGS. 6A and 6B are a simplified flow diagram of at least one embodiment of a method for collaborative optimization that may be executed by an optimization server of the system of FIGS. 1-3.
Figure 6B:
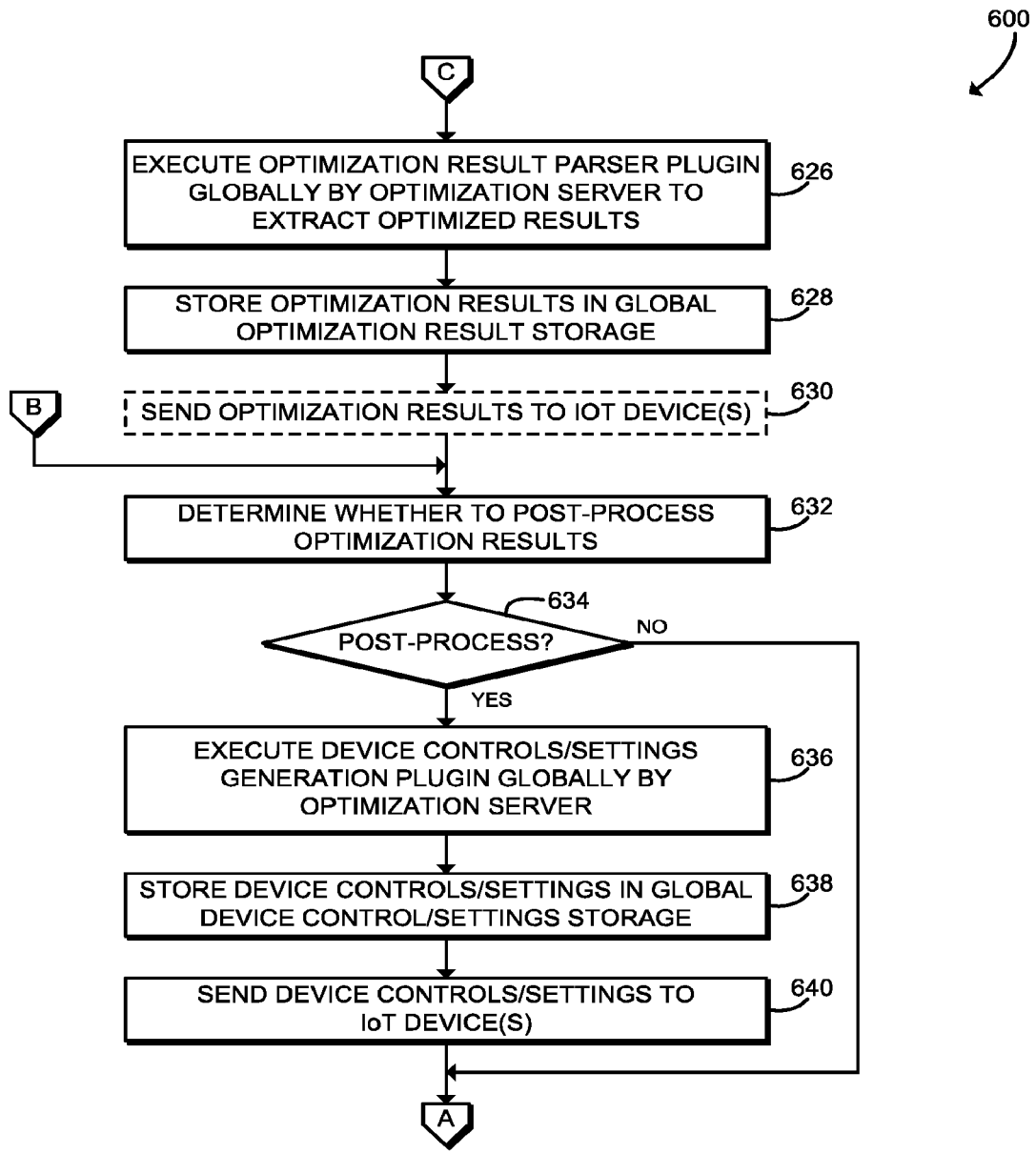

Referring now to FIGS. 6A and 6B, in use, the optimization server 104 may execute a method 600 for collaborative optimization. It should be appreciated that, in some embodiments, the method 600 may be embodied as various instructions stored on a computer-readable media, which may be executed by the processor 140, the I/O subsystem 142, and/or other components of the optimization server 104 to cause the optimization server 104 to perform the method 600. The computer-readable media may be embodied as any type of media capable of being read by the optimization server 104 including, but not limited to, the memory 144, the data storage device 146, firmware devices, and/or other media. Additionally or alternatively, it should be appreciated that, in some embodiments, the operations of the method 600 may be performed by one or more components of the environment 300 of the optimization server 104 as shown in FIG. 3.

The method 600 begins in block 602, in which the optimization server 104 installs the data pre-processing plugin 218, the optimization plugins (e.g., the optimizer parameter generator plugin 208 and the optimization result parser plugin 210), and the device controls/settings plugin 222. The plugins may be provided, for example, by an application developer deploying an IoT application using the system 100.

In block 604, the optimization server 104 may provision any new and/or modified plugins to the IoT devices 102. For example, the optimization server 104 may notify all IoT devices 102 of the availability of new plugins by a broadcast message, and the individual IoT devices 102 may retrieve the plugins from a central repository, for example using SFTP, and then reload the new plugins. As described above in connection with FIGS. 5A and 5B, for certain optimization strategies the IoT devices 102 may execute those plugins locally to perform the pre-processing, optimization, and/or post-processing operations.

In block 606, the optimization server 104 determines whether to pre-process raw device data received from one or more IoT devices 102. For example, the optimization server 104 may pre-process raw data for those IoT devices 102 that have selected the full-global optimization strategy. In block 608, the optimization server 104 checks whether to pre-process the raw data. If not, the method 600 skips ahead to block 616, described below. If the optimization server 104 determines to pre-process raw device data, the method 600 advances to block 610.

In block 610, the optimization server 104 receives raw device data from one or more IoT devices 102 and stores the raw device data in the global raw device data 318. The optimization server 104 may receive the raw device data using any appropriate communication protocol, such as REST, XMPP, MQTT, ZeroMQ, RabbitMQ, WebSockets, OpenADR, ICCP, or other communication protocol.

In block 612, the optimization server 104 executes the data pre-processing plugin 218 globally, generating processed data. As described above, the data pre-processing plugin 218 performs data processing that applies to the raw device data associated with a single IoT device 102, independent of all other IoT devices 102. In some embodiments, the data pre-processing plugin 218 may also use one or more external data sources. The data pre-processing plugin 218 executed by the optimization server 104 is the same data pre-processing plugin 218 that may be executed by the individual IoT devices 102; however, the optimization server 104 executes the data pre-processing plugin 218 at different scale. For example, each IoT device 102 may execute the data pre-processing plugin 218 as a single-threaded process, while the optimization server 104 may execute the data pre-processing plugin 218 as a highly parallel operation. In the illustrative embodiment, each parallel instantiation of the data pre-processing plugin 218 is responsible for pre-processing the raw device data from a single IoT device 102. In block 614, the optimization server 104 stores the processed data in the global processed device data 310.

In block 616, the optimization server 104 determines whether to optimize processed device data. The processed device data may be generated by the optimization server 104 as described above or may be received from one or more IoT devices 102 that have selected the hybrid optimization strategy. In block 618, the optimization server 104 checks whether to optimize the processed device data. If not, the method 600 skips ahead to block 632, shown in FIG. 6B. If the optimization server 104 determines to optimize the processed data, the method 600 advances to block 620.

In block 620, in some embodiments the optimization server 104 may receive processed device data from one or more IoT devices 102 and then store the processed data in the global processed device data 310. For example, the optimization server 104 may receive processed data from one or more IoT devices 102 that have selected the hybrid optimization strategy. The optimization server 104 may receive the processed device data using any appropriate communication protocol, as described above.

In block 622, the optimization server 104 executes the optimizer parameter generator plugin 208 globally, generating optimization parameters. The optimizer parameter generator plugin 208 is the same optimizer parameter generator plugin 208 that may be executed by the individual IoT devices 102. As described above, the optimizer parameter generator plugin 208 transforms, translates, or otherwise processes the processed data to generate features, constraints, and/or other optimization parameters that may be processed by the mathematical optimization unit 308. For example, the optimizer parameter generator plugin 208 provides the optimization objective function and generates data that may be used by the objective function during optimization objective function evaluation. The optimizer parameter generator plugin 208 may also generate feature sets such as initial optimization features, optimization bounds, optimization linear equalities and inequalities, and the optimization non-linear inequality functions. The optimization parameters are each generated as a function of the processed data from a single IoT device 102. The optimizer parameter generator plugin 208 may be implemented as a function that may process data from any number of IoT devices 102. Thus, as described above, the optimizer parameter generator plugin 208 may be executed by the IoT device 102 locally for one device or by the optimization server 104 globally for multiple IoT devices 102.

In block 624, the optimization server 104 executes the mathematical optimization unit 308 globally to generate a vector of optimized features. Similar to the mathematical optimization unit 206 of each IoT device 102, the mathematical optimization unit 308 may execute any machine learning optimization algorithm using the optimization parameters as input. However, the mathematical optimization unit 308 of the optimization server 104 executes as a highly distributed parallel machine learning algorithm. Thus, the optimization server 104 may solve a significantly larger optimization problem by using high parallelization to minimize execution time. The mathematical optimization unit 308 generates a vector of optimized features based on the input optimization parameters.

In block 626, shown in FIG. 6B, the optimization server 104 executes the optimization result parser plugin 210 globally to extract optimization results. The optimization result parser plugin 210 is the same optimization result parser plugin 210 that may be executed by the individual IoT devices 102. As described above, the optimization result parser plugin 210 extracts optimization results from the vector of optimized features. In particular, the optimization result parser plugin 210 may split the vector of optimized features into a sub-list of features for each IoT device 102. For example, the vector of optimized features may include twenty features, with five features for each IoT device 102. In that example, the optimization result parser plugin 210 may split the vector into four blocks of five features each. The optimization result parser plugin 210 may be implemented as a function that may process data from any number of IoT devices 102. Thus, as described above, the optimization result parser plugin 210 may be executed by the IoT device 102 locally for one device or by the optimization server 104 globally for multiple IoT devices 102. In block 628, the optimization server 104 stores the optimization results in the global optimization results data 312.

In some embodiments, in block 630, the optimization server 104 may send the optimization results to one or more IoT devices 102. For example, the optimization server 104 may send the optimization results to IoT devices 102 that have selected the hybrid optimization strategy. The optimization results may be sent with any appropriate communication protocol, as described above.

In block 632, the optimization server 104 determines whether to post-process the optimization results. For example, the optimization server 104 may post-process the optimization results for those IoT devices 102 that have selected the full-global optimization strategy. In block 634, the optimization server 104 checks whether to post-process the optimization results. If not, the method 600 loops back to block 602, shown in FIG. 6A, to continue the collaborative optimization process. If the optimization server 104 determines to post-process the optimization results, the method 600 advances to block 636.

In block 636, the optimization server 104 executes the device controls/settings plugin 222 globally. The device controls/settings plugin 222 transforms, translates, or otherwise processes the optimization results to generate device settings/controls for the sensors/actuators 130 of the IoT devices 102. The device settings/controls may be embodied as settings that each IoT device 102 can interpret and act upon, as controls that each IoT device 102 can relay to its associated sensors/actuators 130, and/or as any other meaningful device controls/settings that may be applied to each IoT device 102. For example, optimization server 104 may convert a set of optimized features into a set of actionable controls to be executed by each IoT device 102 on the associated sensors/actuators 130 over time. The device controls/settings plugin 222 is the same device controls/settings plugin 222 that may be executed by the individual IoT devices 102; however, the optimization server 104 executes the device controls/settings plugin 222 at different scale. For example, each IoT device 102 may execute the device controls/settings plugin 222 as a single-threaded process, while the optimization server 104 may execute the device controls/settings plugin 222 as a highly parallel operation. In the illustrative embodiment, each parallel instantiation of the device controls/settings plugin 222 is responsible for post-processing the optimization results associated with a single IoT device 102. In block 638, the optimization server 104 stores the device controls/settings in the global device controls/settings data 320.

In block 640, the optimization server 104 sends the device controls/settings to the associated IoT devices 102. For example, the optimization server 104 may send device controls/settings to those IoT devices 102 that have selected the full-global optimization strategy. The optimization server 104 may send to each IoT device 102 only the device controls/settings that are associated with the sensors/actuators 130 of that IoT device 102. After sending the device controls/settings, the method 600 loops back to block 602, shown in FIG. 6A, to continue the collaborative optimization process.

Figure 7:
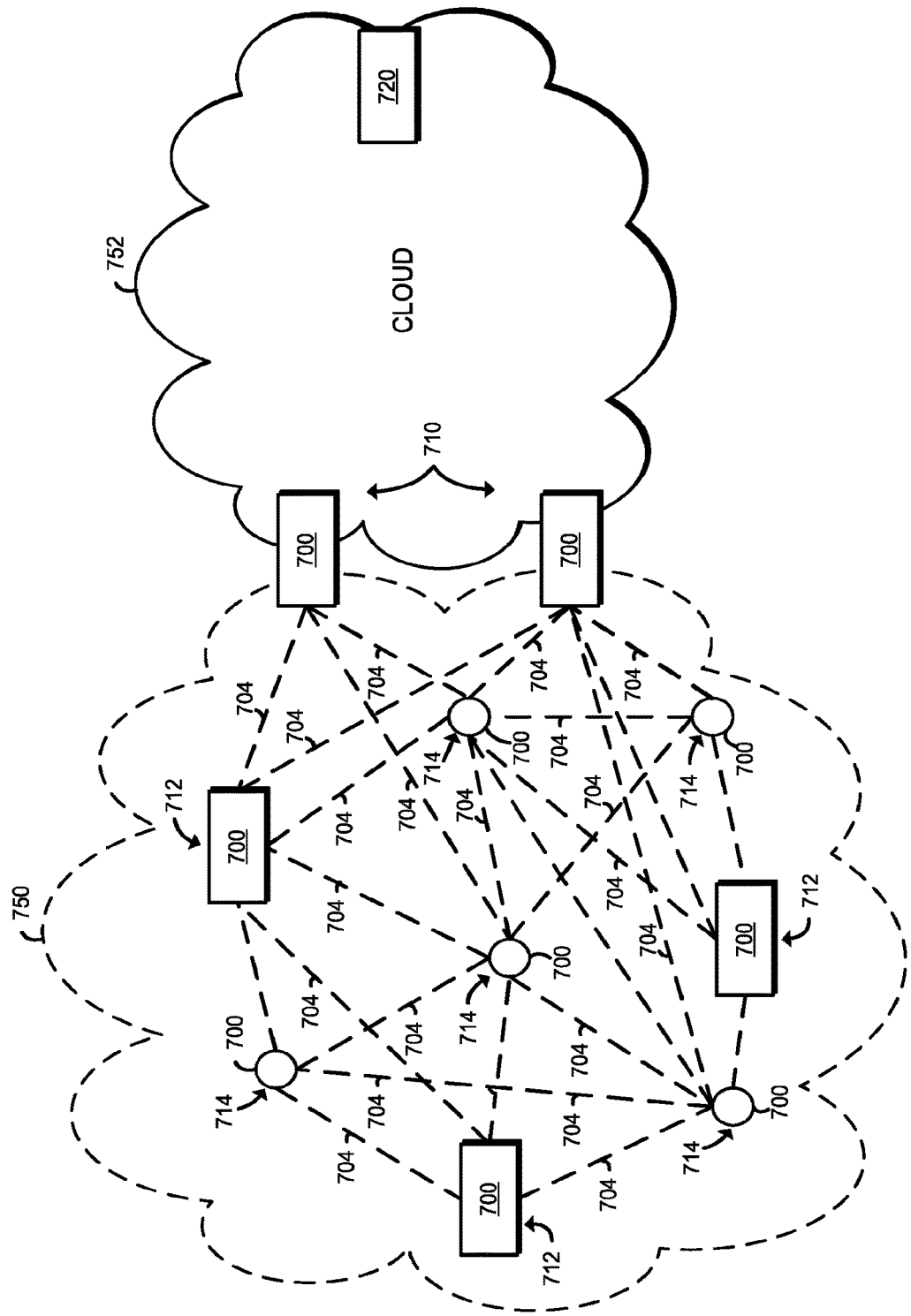
FIG. 7 is a simplified block diagram of another embodiment of the system of FIG. 1 having devices arranged in a mesh network.

Referring now to FIG. 7, in some embodiments, some or all of the IoT devices 102 may be embodied as Internet-of-Things devices 700 and form, potentially with other devices, a mesh network, which may be termed as a fog 750, operating at the edge of a cloud network 752. The fog 750 may be considered to be a massively interconnected network wherein a number of IoT devices 700 are in communications with each other, for example, by radio links 704 (all of which are not labeled in FIG. 19 to simplify the figure and for clarify). This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T-.M.A.N.), among others.

Three types of IoT devices 700 are shown in the example embodiment of FIG. 7, gateways 710, data aggregators 712, and sensors 714, although any combinations of IoT devices 700 and functionality may be used. The gateways 710 may be edge devices that provide communications between the cloud 752 and the fog 750, and may also provide the backend process function for data obtained from sensors 714 (e.g., the sensors/actuators 130, etc.). The data aggregators 712 may collect data from any number of the sensors 714, and perform the back end processing function for the analysis. The results, raw data, or both may be passed along to the cloud 752 through the gateways 710. The sensors 714 may be full IoT devices 700, for example, capable of both collecting data and processing the data. In some cases, the sensors 714 may be more limited in functionality, for example, collecting the data and allowing the data aggregators 712 or gateways 710 to process the data.

Communications from any IoT device 700 may be passed along the most convenient path between any of the IoT devices 700 to reach the gateways 710. In these networks, the number of interconnections provide substantial redundancy, allowing communications to be maintained, even with the loss of a number of IoT devices 700. Further, the use of a mesh network may allow IoT devices 700 that are very low power or located at a distance from infrastructure to be used, as the range to connect to another IoT device 700 may be much less than the range to connect to the gateways 710.

The fog 750 of the IoT devices 700 devices may be presented to devices in the cloud 752, such as a server 720 (which may be embodied as the optimization server 104), as a single device located at the edge of the cloud 752, e.g., a fog 750 device. In this example, the raw device data and/or processed data coming from the fog 750 device may be sent without being identified as coming from a specific IoT device 700 within the fog 750. For example, raw device data associated with a sensor/actuator 130 may be sent, even though the specific IoT device 700 that received the raw device data may not be specifically identified.

In some examples, the IoT devices 700 may be configured using an imperative programming style, e.g., with each IoT device 700 having a specific function and communication partners. However, the IoT devices 700 forming the fog 750 device may be configured in a declarative programming style, allowing the IoT devices 700 to reconfigure their operations and communications, such as to determine needed resources in response to conditions, queries, and device failures. As an example, a command from a user to a server 720 to perform data optimization may result in the fog 750 selecting the IoT devices 700, such as particular sensors 714, needed to answer the query. The data from these sensors 714 may then be aggregated and analyzed by any combination of the sensors 714, data aggregators 712, or gateways 710, before being sent on by the fog 750 device to the server 720 to perform the command. In this example, IoT devices 700 in the fog 750 may select the sensors 714 used based on the command, such as adding data from particular sensors/actuators 130. Further, if some of the IoT devices 700 are not operational, other IoT devices 700 in the fog 750 device may provide analogous data, if available (e.g., data from analogous sensors/actuators 130).

EXAMPLES

Illustrative examples of the technologies disclosed herein are provided below. An embodiment of the technologies may include any one or more, and any combination of, the examples described below.

Example 1 includes a computing device for collaborative optimization, the computing device comprising: a strategy agent to select an optimization strategy based on a device context of the computing device and one or more user preferences, wherein the optimization strategy comprises a full-local optimization strategy, a hybrid optimization strategy, or a full-global optimization strategy; device control logic to receive raw device data from one or more sensors or actuators coupled to the computing device; a data pre-processor to execute a data pre-processing plugin to generate processed data based on the raw device data in response to selection of the full-local optimization strategy; a local optimizer to generate optimization results based on the processed data in response to selection of the full-local optimization strategy; and a data post-processor to execute a device controls/settings plugin to generate device controls/settings for the one or more sensors or actuators based on the optimization results in response to selection of the full-local optimization strategy; wherein the device control logic is further to provide the device controls/settings to the one or more sensors or actuators.

Example 2 includes the subject matter of Example 1, and wherein to generate the optimization results comprises to: execute an optimizer parameter generator plugin to generate input parameters based on the processed data; execute a mathematical optimization unit to generate a vector of optimized features based on the input parameters; and execute an optimization result parser plugin to generate the optimization results based on the vector of optimized features.

Example 3 includes the subject matter of any of Examples 1 and 2, and wherein to execute the mathematical optimization unit comprises to execute a single-threaded machine-learning optimization algorithm.

Example 4 includes the subject matter of any of Examples 1-3, and wherein: the device control logic is further to store the raw device data in a local data storage of the computing device in response to receipt the raw device data and in response to selection of the full-local optimization strategy; the data pre-processor is further to store the processed data in the local data storage in response to execution of the data pre-processing plugin and in response to selection of the full-local optimization strategy; the local optimizer is further to store the optimization results in the local data storage in response to generation of the optimization results and in response to selection of the full-local optimization strategy; and the data post-processor is further to store the device/control settings in the local data storage in response to execution of the device controls/settings plugin and in response to selection of the full-local optimization strategy.

Example 5 includes the subject matter of any of Examples 1-4, and wherein: the data pre-processor is further to execute the data pre-processing plugin to generate the processed data in response to selection of the hybrid optimization strategy; the strategy agent is further to (i) transmit the processed data to an optimization server in response to selection of the hybrid optimization strategy and (ii) receive the optimization results from the optimization server in response to transmission of the processed data; and the data post-processor is further to execute the device controls/settings plugin to generate the device controls/settings for the one or more sensors or actuators based on the optimization results in response to selection of the hybrid optimization strategy.

Example 6 includes the subject matter of any of Examples 1-5, and wherein: the device control logic is further to store the raw device data in a local data storage of the computing device in response to receipt of the raw device data and in response to selection of the hybrid optimization strategy; and the data post-processor is further to store the device/control settings in the local data storage in response to execution of the device controls/settings plugin and in response to selection of the hybrid optimization strategy.

Example 7 includes the subject matter of any of Examples 1-6, and wherein the strategy agent is further to: transmit the raw device data to the optimization server in response to selection of the full-global optimization strategy; and receive the device controls/settings from the optimization server in response to transmission of the raw device data and in response to selection of the full-global optimization strategy.

Example 8 includes the subject matter of any of Examples 1-7, and wherein to select the optimization strategy based on the device context comprises to select the optimization strategy based on whether external network connectivity is available.

Example 9 includes the subject matter of any of Examples 1-8, and wherein to select the optimization strategy based on the device context comprises to select the optimization strategy based on a compute constraint of the computing device.

Example 10 includes the subject matter of any of Examples 1-9, and wherein to select the optimization strategy based on the one or more user preferences comprises to select the optimization strategy based on a power usage constraint.

Example 11 includes the subject matter of any of Examples 1-10, and wherein to select the optimization strategy based on the one or more user preferences comprises to select the optimization strategy based on a user privacy policy.

Example 12 includes the subject matter of any of Examples 1-11, and wherein the user privacy policy allows transmission of no data to an optimization server, allows transmission of the processed data to the optimization server, or allows transmission of any data to the optimization server.

Example 13 includes the subject matter of any of Examples 1-12, and wherein to select the optimization strategy based on the one or more user preferences comprises to select the optimization strategy based on a user preference that indicates whether to perform global optimization.

Example 14 includes the subject matter of any of Examples, 1-13, and wherein to select the optimization strategy based on the device context of the computing device and the one or more user preferences comprises to: detect a conflict between the device context of the computing device and the one or more user preferences; and prompt a user of the computing device for one or more revised user preferences in response to detection of the conflict between the device context of the computing device and the one or more user preferences.

Example 15 includes the subject matter of any of Examples 1-14, and wherein to select the optimization strategy based on the device context of the computing device and the one or more user preferences comprises to: determine whether any optimization strategy may be successfully executed based on the device context of the computing device and the one or more user preferences; and notify a user of the computing device in response to a determination that no optimization strategy may be successfully executed.

Example 16 includes a computing device for collaborative optimization, the computing device comprising a global optimizer to: execute an optimizer parameter generator plugin to generate input parameters based on processed data associated with a plurality of remote computing devices; execute a global optimization unit to generate a vector of optimized features based on the input parameters; and execute an optimization result parser plugin to generate optimization results based on the vector of optimized features, wherein the optimization results are associated with the plurality of remote computing devices.

Example 17 includes the subject matter of Example 16, and wherein to execute the global optimization unit comprises to execute a parallel machine learning optimization algorithm.

Example 18 includes the subject matter of any of Examples 16 and 17, and further comprising a strategy agent to: receive the processed data from the plurality of remote computing devices; and send the optimization results to the plurality of remote computing devices.

Example 19 includes the subject matter of any of Examples 16-18, and further comprising a plugin manager to provision the optimizer parameter generator plugin and the optimization result parser plugin to the plurality of remote computing devices.

Example 20 includes the subject matter of any of Examples 16-19, and further comprising: a data pre-processor to execute a data pre-processing plugin to generate processed data based on raw device data associated with the plurality of remote computing devices, wherein the raw device data is generated by one or more sensors or actuators coupled to each of the plurality of remote computing devices; and a data post-processor to execute a device controls/settings plugin to generate device controls/settings for the one or more sensors or actuators based on the optimization results in response to execution of the optimization result parser plugin; wherein to execute the optimizer parameter generator plugin comprises to execute the optimizer parameter generator plugin in response to execution of the data pre-processing plugin.

Example 21 includes the subject matter of any of Examples 16-20, and further comprising a strategy agent to: receive the raw device data from the plurality of remote computing devices; and send the device controls/settings to the plurality of remote computing devices.

Example 22 includes the subject matter of any of Examples 16-21, and further comprising a plugin manager to provision the data pre-processing plugin and the device controls/settings plugin to the plurality of remote computing devices.

Example 23 includes a method for collaborative optimization, the method comprising: selecting, by a computing device, an optimization strategy based on a device context of the computing device and one or more user preferences, wherein the optimization strategy comprises a full-local optimization strategy, a hybrid optimization strategy, or a full-global optimization strategy; receiving, by the computing device, raw device data from one or more sensors or actuators coupled to the computing device; in response to selecting the full-local optimization strategy: executing, by the computing device, a data pre-processing plugin to generate processed data based on the raw device data; generating, by the computing device, optimization results based on the processed data; and executing, by the computing device, a device controls/settings plugin to generate device controls/settings for the one or more sensors or actuators based on the optimization results; and providing, by the computing device, the device controls/settings to the one or more sensors or actuators.

Example 24 includes the subject matter of Example 23, and wherein generating the optimization results comprises: executing an optimizer parameter generator plugin to generate input parameters based on the processed data; executing a mathematical optimization unit to generate a vector of optimized features based on the input parameters; and executing an optimization result parser plugin to generate the optimization results based on the vector of optimized features.

Example 25 includes the subject matter of any of Examples 23 and 24, and wherein executing the mathematical optimization unit comprises executing a single-threaded machine-learning optimization algorithm.

Example 26 includes the subject matter of any of Examples 23-25, and further comprising, in response to selecting the full-local optimization strategy: storing, by the computing device, the raw device data in a local data storage of the computing device in response to receiving the raw device data; storing, by the computing device, the processed data in the local data storage in response to executing the data pre-processing plugin; storing, by the computing device, the optimization results in the local data storage in response to generating the optimization results; and storing, by the computing device, the device/control settings in the local data storage in response to executing the device controls/settings plugin.

Example 27 includes the subject matter of any of Examples 23-26, and further comprising, in response to selecting the hybrid optimization strategy: executing, by the computing device, the data pre-processing plugin to generate the processed data; transmitting, by the computing device, the processed data to an optimization server; receiving, by the computing device, the optimization results from the optimization server in response to transmitting the processed data; and executing, by the computing device, the device controls/settings plugin to generate the device controls/settings for the one or more sensors or actuators based on the optimization results.

Example 28 includes the subject matter of any of Examples 23-27, and further comprising, in response to selecting the hybrid optimization strategy: storing, by the computing device, the raw device data in a local data storage of the computing device in response to receiving the raw device data; and storing, by the computing device, the device/control settings in the local data storage in response to executing the device controls/settings plugin.

Example 29 includes the subject matter of any of Examples 23-28, and further comprising, in response to selecting the full-global optimization strategy: transmitting, by the computing device, the raw device data to the optimization server; and receiving, by the computing device, the device controls/settings from the optimization server in response to transmitting the raw device data.

Example 30 includes the subject matter of any of Examples 23-29, and wherein selecting the optimization strategy based on the device context comprises selecting the optimization strategy based on whether external network connectivity is available.

Example 31 includes the subject matter of any of Examples 23-30, and wherein selecting the optimization strategy based on the device context comprises selecting the optimization strategy based on a compute constraint of the computing device.

Example 32 includes the subject matter of any of Examples 23-31, and wherein selecting the optimization strategy based on the one or more user preferences comprises selecting the optimization strategy based on a power usage constraint.

Example 33 includes the subject matter of any of Examples 23-32, and wherein selecting the optimization strategy based on the one or more user preferences comprises selecting the optimization strategy based on a user privacy policy.

Example 34 includes the subject matter of any of Examples 23-33, and wherein the user privacy policy allows transmission of no data to an optimization server, allows transmission of the processed data to the optimization server, or allows transmission of any data to the optimization server.

Example 35 includes the subject matter of any of Examples 23-34, and wherein selecting the optimization strategy based on the one or more user preferences comprises selecting the optimization strategy based on a user preference indicating whether to perform global optimization.

Example 36 includes the subject matter of any of Examples 23-35, and wherein selecting the optimization strategy based on the device context of the computing device and the one or more user preferences comprises: detecting a conflict between the device context of the computing device and the one or more user preferences; and prompting a user of the computing device for one or more revised user preferences in response to detecting the conflict between the device context of the computing device and the one or more user preferences.

Example 37 includes the subject matter of any of Examples 23-36, and wherein selecting the optimization strategy based on the device context of the computing device and the one or more user preferences comprises: determining whether any optimization strategy may be successfully executed based on the device context of the computing device and the one or more user preferences; and notifying a user of the computing device in response to determining that no optimization strategy may be successfully executed.

Example 38 includes a method for collaborative optimization, the method comprising: executing, by a computing device, an optimizer parameter generator plugin to generate input parameters based on processed data associated with a plurality of remote computing devices; executing, by the computing device, a global optimization unit to generate a vector of optimized features based on the input parameters; and executing, by the computing device, an optimization result parser plugin to generate optimization results based on the vector of optimized features, wherein the optimization results are associated with the plurality of remote computing devices.

Example 39 includes the subject matter of Example 38, and wherein executing the global optimization unit comprises executing a parallel machine learning optimization algorithm.

Example 40 includes the subject matter of any of Examples 38 and 39, and further comprising: receiving, by the computing device, the processed data from the plurality of remote computing devices; and sending, by the computing device, the optimization results to the plurality of remote computing devices.

Example 41 includes the subject matter of any of Examples 38-40, and further comprising provisioning, by the computing device, the optimizer parameter generator plugin and the optimization result parser plugin to the plurality of remote computing devices.

Example 42 includes the subject matter of any of Examples 38-41, and further comprising: executing, by the computing device, a data pre-processing plugin to generate processed data based on raw device data associated with the plurality of remote computing devices, wherein the raw device data is generated by one or more sensors or actuators coupled to each of the plurality of remote computing devices; and executing, by the computing device, a device controls/settings plugin to generate device controls/settings for the one or more sensors or actuators based on the optimization results in response to executing the optimization result parser plugin; wherein executing the optimizer parameter generator plugin comprises executing the optimizer parameter generator plugin in response to executing the data pre-processing plugin.

Example 43 includes the subject matter of any of Examples 38-42, and further comprising: receiving, by the computing device, the raw device data from the plurality of remote computing devices; and sending, by the computing device, the device controls/settings to the plurality of remote computing devices.

Example 44 includes the subject matter of any of Examples 38-43, and further comprising provisioning, by the computing device, the data pre-processing plugin and the device controls/settings plugin to the plurality of remote computing devices.

Example 45 includes a computing device comprising: a processor; and a memory having stored therein a plurality of instructions that when executed by the processor cause the computing device to perform the method of any of Examples 23-44.

Example 46 includes one or more machine readable storage media comprising a plurality of instructions stored thereon that in response to being executed result in a computing device performing the method of any of Examples 23-44.

Example 47 includes a computing device comprising means for performing the method of any of Examples 23-44.

Example 48 includes a computing device for collaborative optimization, the computing device comprising: means for selecting an optimization strategy based on a device context of the computing device and one or more user preferences, wherein the optimization strategy comprises a full-local optimization strategy, a hybrid optimization strategy, or a full-global optimization strategy; means for receiving raw device data from one or more sensors or actuators coupled to the computing device; means for executing a data pre-processing plugin to generate processed data based on the raw device data in response to selecting the full-local optimization strategy; means for generating optimization results based on the processed data in response to selecting the full-local optimization strategy; means for executing a device controls/settings plugin to generate device controls/settings for the one or more sensors or actuators based on the optimization results in response to selecting the full-local optimization strategy; and means for providing the device controls/settings to the one or more sensors or actuators.

Example 49 includes the subject matter of Example 48, and wherein the means for generating the optimization results comprises: means for executing an optimizer parameter generator plugin to generate input parameters based on the processed data; means for executing a mathematical optimization unit to generate a vector of optimized features based on the input parameters; and means for executing an optimization result parser plugin to generate the optimization results based on the vector of optimized features.

Example 50 includes the subject matter of any of Examples 48 and 49, and wherein the means for executing the mathematical optimization unit comprises means for executing a single-threaded machine-learning optimization algorithm.

Example 51 includes the subject matter of any of Examples 48-50, and further comprising: means for storing the raw device data in a local data storage of the computing device in response to receiving the raw device data in response to selecting the full-local optimization strategy; means for storing the processed data in the local data storage in response to executing the data pre-processing plugin and in response to selecting the full-local optimization strategy; means for storing the optimization results in the local data storage in response to generating the optimization results and in response to selecting the full-local optimization strategy; and means for storing the device/control settings in the local data storage in response to executing the device controls/settings plugin and in response to selecting the full-local optimization strategy.

Example 52 includes the subject matter of any of Examples 48-51, and further comprising: means for executing the data pre-processing plugin to generate the processed data in response to selecting the hybrid optimization strategy; means for transmitting the processed data to an optimization server in response to selecting the hybrid optimization strategy; means for receiving the optimization results from the optimization server in response to transmitting the processed data and in response to selecting the hybrid optimization strategy; and means for executing the device controls/settings plugin to generate the device controls/settings for the one or more sensors or actuators based on the optimization results in response to selecting the hybrid optimization strategy.

Example 53 includes the subject matter of any of Examples 48-52, and further comprising: means for storing the raw device data in a local data storage of the computing device in response to receiving the raw device data and in response to selecting the hybrid optimization strategy; and means for storing the device/control settings in the local data storage in response to executing the device controls/settings plugin and in response to selecting the hybrid optimization strategy.

Example 54 includes the subject matter of any of Examples 48-53, and further comprising: means for transmitting the raw device data to the optimization server in response to selecting the full-global optimization strategy; and means for receiving the device controls/settings from the optimization server in response to transmitting the raw device data and in response to selecting the full-global optimization strategy.

Example 55 includes the subject matter of any of Examples 48-54, and wherein the means for selecting the optimization strategy based on the device context comprises means for selecting the optimization strategy based on whether external network connectivity is available.

Example 56 includes the subject matter of any of Examples 48-55, and wherein the means for selecting the optimization strategy based on the device context comprises means for selecting the optimization strategy based on a compute constraint of the computing device.

Example 57 includes the subject matter of any of Examples 48-56, and wherein the means for selecting the optimization strategy based on the one or more user preferences comprises means for selecting the optimization strategy based on a power usage constraint.

Example 58 includes the subject matter of any of Examples 48-57, and wherein the means for selecting the optimization strategy based on the one or more user preferences comprises means for selecting the optimization strategy based on a user privacy policy.

Example 59 includes the subject matter of any of Examples 48-58, and wherein the user privacy policy allows transmission of no data to an optimization server, allows transmission of the processed data to the optimization server, or allows transmission of any data to the optimization server.

Example 60 includes the subject matter of any of Examples 48-59, and wherein the means for selecting the optimization strategy based on the one or more user preferences comprises means for selecting the optimization strategy based on a user preference indicating whether to perform global optimization.

Example 61 includes the subject matter of any of Examples 48-60, and wherein the means for selecting the optimization strategy based on the device context of the computing device and the one or more user preferences comprises: means for detecting a conflict between the device context of the computing device and the one or more user preferences; and means for prompting a user of the computing device for one or more revised user preferences in response to detecting the conflict between the device context of the computing device and the one or more user preferences.

Example 62 includes the subject matter of any of Examples 48-61, and wherein the means for selecting the optimization strategy based on the device context of the computing device and the one or more user preferences comprises: means for determining whether any optimization strategy may be successfully executed based on the device context of the computing device and the one or more user preferences; and means for notifying a user of the computing device in response to determining that no optimization strategy may be successfully executed.

Example 63 includes a computing device for collaborative optimization, the computing device comprising: means for executing an optimizer parameter generator plugin to generate input parameters based on processed data associated with a plurality of remote computing devices; means for executing a global optimization unit to generate a vector of optimized features based on the input parameters; and means for executing an optimization result parser plugin to generate optimization results based on the vector of optimized features, wherein the optimization results are associated with the plurality of remote computing devices.

Example 64 includes the subject matter of Example 63, and wherein the means for executing the global optimization unit comprises executing a parallel machine learning optimization algorithm.

Example 65 includes the subject matter of any of Examples 63 and 64, and further comprising: means for receiving the processed data from the plurality of remote computing devices; and means for sending the optimization results to the plurality of remote computing devices.

Example 66 includes the subject matter of any of Examples 63-65, and further comprising means for provisioning the optimizer parameter generator plugin and the optimization result parser plugin to the plurality of remote computing devices.

Example 67 includes the subject matter of any of Examples 63-66, and further comprising: means for executing a data pre-processing plugin to generate processed data based on raw device data associated with the plurality of remote computing devices, wherein the raw device data is generated by one or more sensors or actuators coupled to each of the plurality of remote computing devices; and means for executing a device controls/settings plugin to generate device controls/settings for the one or more sensors or actuators based on the optimization results in response to executing the optimization result parser plugin; wherein the means for executing the optimizer parameter generator plugin comprises means for executing the optimizer parameter generator plugin in response to executing the data pre-processing plugin.

Example 68 includes the subject matter of any of Examples 63-67, and further comprising: means for receiving the raw device data from the plurality of remote computing devices; and means for sending the device controls/settings to the plurality of remote computing devices.

Example 69 includes the subject matter of any of Examples 63-68, and further comprising means for provisioning the data pre-processing plugin and the device controls/settings plugin to the plurality of remote computing devices.

The invention claimed is:

1. A system for collaborative optimization, the system comprising:
a centralized strategy agent coupled to a plurality of Internet of Things (IoT) devices via a network;
wherein the centralized strategy agent is to (i) receive device context and one or more user preferences associated with the plurality of IoT devices; (ii) select an optimization strategy for each of the plurality of IoT devices based on the device context and the one or more user preferences associated with the plurality of IoT devices, wherein each optimization strategy comprises a full-local optimization strategy, a hybrid optimization strategy, or a full-global optimization strategy; and (iii) provision the corresponding optimization strategy to each IoT device of the plurality of IoT devices;
wherein each IoT device of the plurality of IoT device comprises:
device control logic to (i) receive raw device data from one or more sensors or actuators coupled to the IoT device and (ii) provide device controls/settings to the one or more sensors or actuators;
a data pre-processor to execute, by a processor of the IoT device, a data pre-processing plugin in response to selection of the full-local optimization strategy for the IoT device, wherein the data pre-processing plugin comprises executable computer code that, when executed by the processor, causes the IoT device to generate processed data based on the raw device data;
a local optimizer to generate optimization results based on the processed data in response to selection of the full-local optimization strategy for the IoT device; and
a data post-processor to execute a device controls/settings plugin to generate the device controls/settings for the one or more sensors or actuators based on the optimization results in response to selection of the full-local optimization strategy for the IoT device.

2. The system of claim 1, wherein to generate the optimization results comprises to:
execute an optimizer parameter generator plugin to generate input parameters based on the processed data;
execute a mathematical optimization unit to generate a vector of optimized features based on the input parameters; and
execute an optimization result parser plugin to generate the optimization results based on the vector of optimized features.

3. The system of claim 1, wherein:
the data pre-processor of each IoT device is further to execute the data pre-processing plugin data in response to selection of the hybrid optimization strategy for the IoT device;
each IoT device further comprises a strategy agent to (i) transmit the processed data to an optimization server in response to selection of the hybrid optimization strategy for the IoT device and (ii) receive the optimization results from the optimization server in response to transmission of the processed data; and the data post-processor of each IoT device is further to execute the device controls/settings plugin to generate the device controls/settings for the one or more sensors or actuators based on the optimization results in response to selection of the hybrid optimization strategy for the IoT device.

4. The system of claim 3, wherein the strategy agent of each IoT device is further to:
transmit the raw device data to the optimization server in response to selection of the full-global optimization strategy for the IoT device; and
receive the device controls/settings from the optimization server in response to transmission of the raw device data and in response to selection of the full-global optimization strategy for the IoT device.

5. The system of claim 1, wherein to select the optimization strategy based on the device context comprises to select the optimization strategy based on whether external network connectivity is available.

6. The system of claim 1, wherein to select the optimization strategy for each of the plurality of IoT devices based on the device context and the one or more user preferences associated with the plurality of IoT devices comprises to select the optimization strategy based on a compute constraint associated with one or more of the IoT devices.

7. The system of claim 1, wherein to select the optimization strategy based on the one or more user preferences comprises to select the optimization strategy based on a power usage constraint.

8. The system of claim 1, wherein to select the optimization strategy based on the one or more user preferences comprises to select the optimization strategy based on a user privacy policy.

9. The system of claim 1, wherein to select the optimization strategy based on the one or more user preferences comprises to select the optimization strategy based on a user preference that indicates whether to perform global optimization.

10. The system of claim 1, wherein to select the optimization strategy for each of the plurality of IoT devices based on the device context and the one or more user preferences associated with the plurality of IoT devices comprises to:
detect a conflict between the device context associated with the plurality of IoT devices and the one or more user preferences; and
prompt a user of the system for one or more revised user preferences in response to detection of the conflict between the device context associated with the plurality of IoT devices and the one or more user preferences.

11. A method for collaborative optimization, the method comprising:
receiving, by a centralized strategy agent, device context and one or more user preferences associated with a plurality of Internet of Things (IoT) devices, wherein the centralized strategy agent is coupled to the plurality of IoT devices via a network;
selecting, by the centralized strategy agent, an optimization strategy for each of the plurality of IoT devices based on the device context and the one or more user preferences associated with the plurality of IoT devices, wherein each optimization strategy comprises a full-local optimization strategy, a hybrid optimization strategy, or a full-global optimization strategy;
provisioning, by the centralized strategy agent, the corresponding optimization strategy to each IoT device of the plurality of IoT devices;
receiving, by each IoT device of the plurality of IoT devices, raw device data from one or more sensors or actuators coupled to the IoT device;
executing, by a processor of each IoT device, a data pre-processing plugin in response to selection of the full-local optimization strategy for the IoT device, wherein the data pre-processing plugin comprises executable computer code that, when executed by the processor, causes the IoT device to generate processed data based on the raw device data;
generating, by each IoT device, optimization results based on the processed data in response to selection of the full-local optimization strategy for the IoT device;
executing, by the IoT device, a device controls/settings plugin to generate device controls/settings for the one or more sensors or actuators based on the optimization results in response to selection of the full-local optimization strategy for the IoT device; and
providing, by the IoT device, the device controls/settings to the one or more sensors or actuators.

12. The method of claim 11, wherein selecting the optimization strategy based on the device context comprises selecting the optimization strategy based on whether external network connectivity is available.

13. The method of claim 11, wherein selecting the optimization strategy for each of the plurality of IoT devices based on the device context and the one or more user preferences associated with the plurality of IoT devices comprises selecting the optimization strategy based on a compute constraint associated with one or more of the IoT devices.

14. The method of claim 11, wherein selecting the optimization strategy based on the one or more user preferences comprises selecting the optimization strategy based on a power usage constraint.

15. The method of claim 11, wherein selecting the optimization strategy based on the one or more user preferences comprises selecting the optimization strategy based on a user privacy policy.

16. One or more computer-readable storage media comprising a plurality of instructions that in response to being executed cause a centralized strategy agent to:
receive device context and one or more user preferences associated with a plurality of Internet of Things (IoT) devices, wherein the centralized strategy agent is coupled to the plurality of IoT devices via a network;
select an optimization strategy for each of the plurality of IoT devices based on the device context and the one or more user preferences associated with the plurality of IoT devices, wherein each optimization strategy comprises a full-local optimization strategy, a hybrid optimization strategy, or a full-global optimization strategy; and
provision the corresponding optimization strategy to each IoT device of the plurality of IoT devices.

17. The one or more computer-readable storage media of claim 16, wherein to select the optimization strategy based on the device context comprises to select the optimization strategy based on whether external network connectivity is available.

18. The one or more computer-readable storage media of claim 16, wherein to select the optimization strategy for each of the plurality of IoT devices based on the device context and the one or more user preferences associated with the plurality of IoT devices comprises to select the optimization strategy based on a compute constraint associated with one or more of the IoT devices.

19. The one or more computer-readable storage media of claim 16, wherein to select the optimization strategy based on the one or more user preferences comprises to select the optimization strategy based on a power usage constraint.

20. The one or more computer-readable storage media of claim 16, wherein to select the optimization strategy based on the one or more user preferences comprises to select the optimization strategy based on a user privacy policy.

21. The one or more computer-readable storage media of claim 16, further comprising a plurality of instructions that in response to being executed cause each IoT device of the plurality of IoT devices to:
receive raw device data from one or more sensors or actuators coupled to the IoT device;
execute, by a processor of the IoT device, a data pre-processing plugin in response to selection of the full-local optimization strategy for the IoT device, wherein the data pre-processing plugin comprises executable computer code that, when executed by the processor, causes the IoT device to generate processed data based on the raw device data;
generate optimization results based on the processed data in response to selection of the full-local optimization strategy for the IoT device;
execute a device controls/settings plugin to generate device controls/settings for the one or more sensors or actuators based on the optimization results in response to selection of the full-local optimization strategy for the IoT device; and
provide the device controls/settings to the one or more sensors or actuators.

22. A system for collaborative optimization, the system comprising:
a centralized strategy agent comprising:
means for receiving device context and one or more user preferences associated with a plurality of Internet of Things (IoT) devices, wherein the centralized strategy agent is coupled to the plurality of IoT devices via a network;
means for selecting an optimization strategy for each of the plurality of IoT devices based on the device context and the one or more user preferences associated with the plurality of IoT devices, wherein each optimization strategy comprises a full-local optimization strategy, a hybrid optimization strategy, or a full-global optimization strategy; and
means for provisioning the corresponding optimization strategy to each IoT device of the plurality of IoT devices;
wherein each IoT device of the plurality of IoT devices comprises:
means for receiving raw device data from one or more sensors or actuators coupled to the IoT device;
means for executing, by a processor of each IoT device, a data pre-processing plugin in response to selection of the full-local optimization strategy for the IoT device, wherein the data pre-processing plugin comprises executable computer code that, when executed by the processor, causes the IoT device to generate processed data based on the raw device data;
means for generating optimization results based on the processed data in response to selection of the full-local optimization strategy for the IoT device;
means for executing a device controls/settings plugin to generate device controls/settings for the one or more sensors or actuators based on the optimization results in response to selection of the full-local optimization strategy for the IoT device; and
means for providing the device controls/settings to the one or more sensors or actuators.

23. The system of claim 22, wherein the means for selecting the optimization strategy based on the device context comprises means for selecting the optimization strategy based on whether external network connectivity is available.

24. The system of claim 22, wherein the means for selecting the optimization strategy for each of the plurality of IoT devices based on the device context and the one or more user preferences associated with the plurality of IoT devices comprises means for selecting the optimization strategy based on a compute constraint associated with one or more of the IoT devices.

25. The system of claim 22, wherein the means for selecting the optimization strategy based on the one or more user preferences comprises means for selecting the optimization strategy based on a power usage constraint.

26. The system of claim 22, wherein the means for selecting the optimization strategy based on the one or more user preferences comprises means for selecting the optimization strategy based on a user privacy policy.

* * * * *